(12) United States Patent
Marotz et al.

(10) Patent No.: US 9,062,441 B2
(45) Date of Patent: Jun. 23, 2015

(54) CABLE OVERLOAD DEVICE

(75) Inventors: Benjamin Marotz, Kohler, WI (US);
Murali Natarajan, Sheboygan, WI (US); Andrew Stokes, Sheybogan, WI (US); Lisa Burns, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 277 days.

(21) Appl. No.: 13/588,470

(22) Filed: Aug. 17, 2012

(65) Prior Publication Data

US 2013/0042405 A1 Feb. 21, 2013

Related U.S. Application Data

(60) Provisional application No. 61/525,049, filed on Aug. 18, 2011.

(51) Int. Cl.
*E03C 1/12* (2006.01)
*E03C 1/23* (2006.01)
*E03C 1/232* (2006.01)
*F16C 1/16* (2006.01)
*F16C 1/22* (2006.01)
*E03C 1/24* (2006.01)

(52) U.S. Cl.
CPC .............. *E03C 1/2304* (2013.01); *E03C 1/232* (2013.01); *E03C 1/24* (2013.01); *F16C 1/16* (2013.01); *F16C 1/223* (2013.01); *E03C 2201/50* (2013.01)

(58) Field of Classification Search
CPC .................................. F16C 1/16; F16C 1/223
USPC ............. 4/679, 680, 682–685, 688–690, 693, 4/287
See application file for complete search history.

(56) References Cited

U.S. PATENT DOCUMENTS 413,365 A * 10/1889 Gilcher .............................. 4/688
641,769 A * 1/1900 Hamm .............................. 4/688
(Continued)

FOREIGN PATENT DOCUMENTS

DE 2020090 15 538 4/2011
EP 2 226 435 9/2010
(Continued)

OTHER PUBLICATIONS

Install the wrong bath waste system and your beautiful bathroom could go down the drain, Products, date unknown, 1 page.
(Continued)

*Primary Examiner* — Paul R Durand
*Assistant Examiner* — Erin Deery
(74) *Attorney, Agent, or Firm* — Foley & Lardner LLP

(57) ABSTRACT

A cable overload device for a cable-actuated drain system having a drain valve assembly and a drain control assembly where the cable includes a driving end connected to the control assembly and a driven end. The overload device includes a plunger, a linking member, a sleeve, and an energy absorber. The plunger is configured to be coupled to the driven end of the cable. The linking member is configured to move the drain valve assembly between open and closed positions. The sleeve includes a bore that extends from a first side to a second side of the sleeve, wherein the bore is configured to receive the plunger through the first side and to receive the linking member through the second side. The energy absorber is provided in the bore between the plunger and the linking member to absorb a force imposed into the linking member from the drain valve assembly.

26 Claims, 23 Drawing Sheets

(56) References Cited

U.S. PATENT DOCUMENTS

| | | | | |
|---|---|---|---|---|
| 645,639 | A | * | 3/1900 | Bunting .......................... 4/690 |
| 1,943,628 | A | * | 1/1934 | Schultis .......................... 4/685 |
| 1,974,419 | A | * | 9/1934 | Cornell, Jr. ..................... 4/688 |
| 1,980,493 | A | | 11/1934 | Morisseau |
| 2,059,120 | A | * | 10/1936 | Kreuzer et al. ................. 4/685 |
| 2,223,365 | A | | 12/1940 | Groeniger |
| 3,493,978 | A | | 2/1970 | Hindman et al. |
| 4,411,028 | A | * | 10/1983 | Hogner .......................... 4/691 |
| 4,594,738 | A | * | 6/1986 | Gebert .......................... 4/680 |
| 4,744,108 | A | * | 5/1988 | Schmidt ......................... 4/694 |
| 5,025,509 | A | | 6/1991 | Holt et al. |
| 5,787,521 | A | * | 8/1998 | O'Connell et al. .............. 4/689 |
| 5,822,812 | A | * | 10/1998 | Worthington et al. .......... 4/689 |
| 6,347,417 | B1 | * | 2/2002 | Ohta .............................. 4/689 |
| 6,637,051 | B1 | * | 10/2003 | Swart ............................ 4/688 |
| 7,886,372 | B2 | * | 2/2011 | Jacobs ........................... 4/295 |
| 7,984,521 | B2 | * | 7/2011 | Schintler et al. ................ 4/689 |
| 8,201,289 | B2 | | 6/2012 | Edmonds et al. |
| 8,468,619 | B2 | * | 6/2013 | Cen ............................... 4/689 |
| 8,769,736 | B2 | | 7/2014 | Ball |
| 2008/0229493 | A1 | | 9/2008 | Rudisser |
| 2009/0255054 | A1 | * | 10/2009 | Duncan .......................... 4/689 |
| 2011/0099711 | A1 | * | 5/2011 | Cerutti .......................... 4/689 |

FOREIGN PATENT DOCUMENTS

| | | |
|---|---|---|
| FR | 2157523 | 6/1973 |
| FR | 2578667 | 9/1986 |
| FR | 2850406 | 7/2004 |
| GB | 0 643 215 | 6/1950 |
| JP | 46-019975 | 7/1971 |
| JP | 49-116335 | 10/1974 |
| JP | 60-053867 | 4/1985 |
| JP | 62-159576 | 10/1987 |
| JP | 63-010986 | 1/1988 |
| JP | 63-010987 | 1/1988 |
| JP | 03-032660 | 3/1991 |
| JP | 03-032661 | 3/1991 |
| JP | 03-122174 | 12/1991 |
| JP | 03-122175 | 12/1991 |
| JP | 03-122176 | 12/1991 |
| JP | 05-311712 | 11/1993 |
| JP | 05-089569 | 12/1993 |
| JP | 05-089570 | 12/1993 |
| JP | 05-089571 | 12/1993 |
| JP | 05-096171 | 12/1993 |
| JP | 06-299580 | 10/1994 |
| JP | 08-061556 | 3/1996 |
| JP | 09-209429 | 8/1997 |
| JP | 10-237915 | 9/1998 |
| JP | 11-021965 | 1/1999 |
| JP | 11-021966 | 1/1999 |
| JP | 11-093236 | 4/1999 |
| JP | 11-313771 | 11/1999 |
| JP | 2000-073426 | 3/2000 |
| JP | 2000-110219 | 4/2000 |
| JP | 2000-220187 | 8/2000 |
| JP | 2000-303530 | 10/2000 |
| JP | 2001-329591 | 11/2001 |
| JP | 2002-054206 | 2/2002 |
| JP | 2002-275957 | 9/2002 |
| JP | 2003-074102 | 3/2003 |
| JP | 2009-189453 | 8/2009 |
| JP | 2009-264069 | 11/2009 |
| JP | 2010-001678 | 1/2010 |
| JP | 2010-156180 | 7/2010 |

OTHER PUBLICATIONS

Installation, www.geberit.us, date unknown, 4 pages.
International Search Report and Written Opinion for PCT US2012/051388, mail date May 10, 2013, 21 pages.
Introducing the Watco Innovator Cable bath waste system:fully repairable from inside the tub, Company profile:Watco,date unknown, 1 page.

* cited by examiner

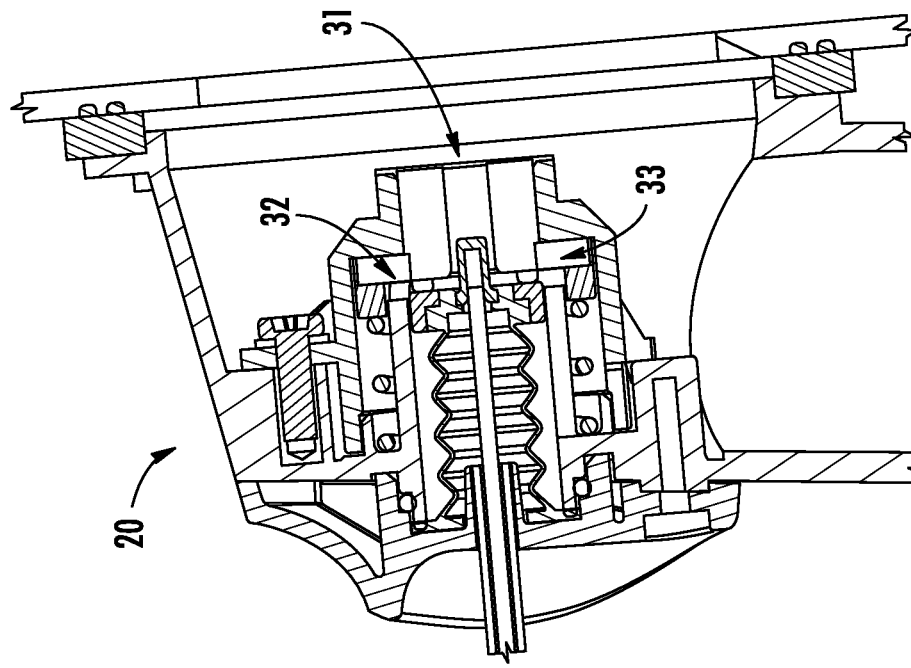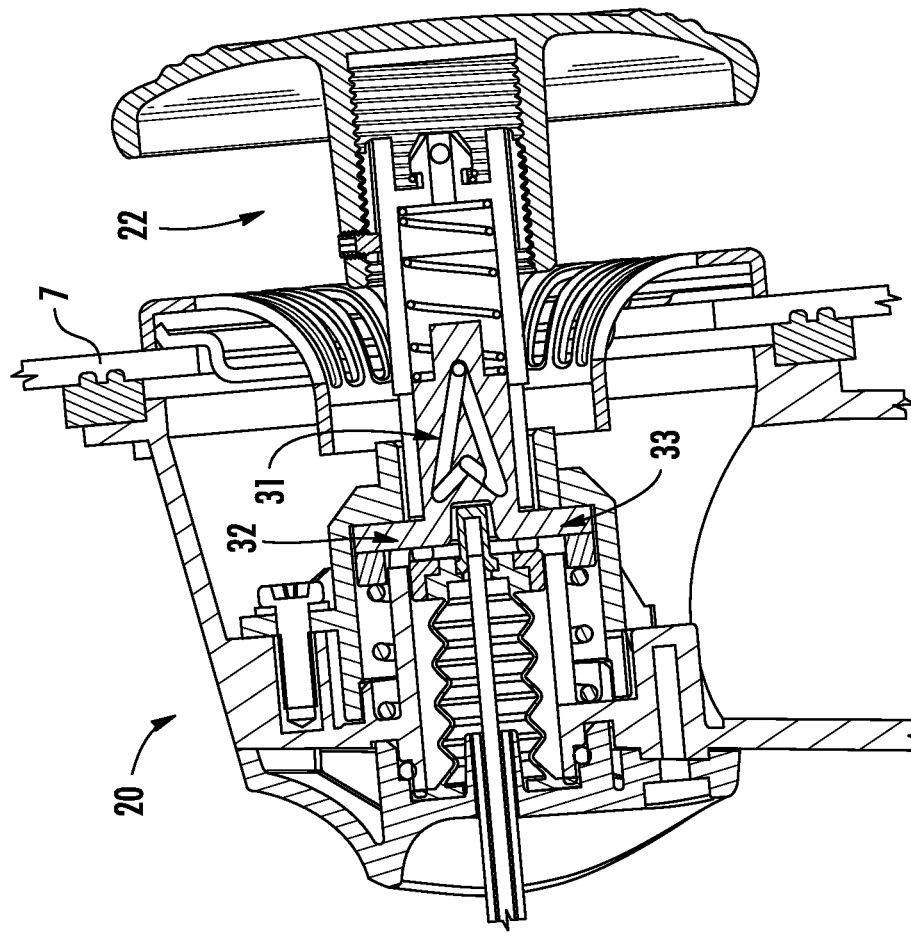

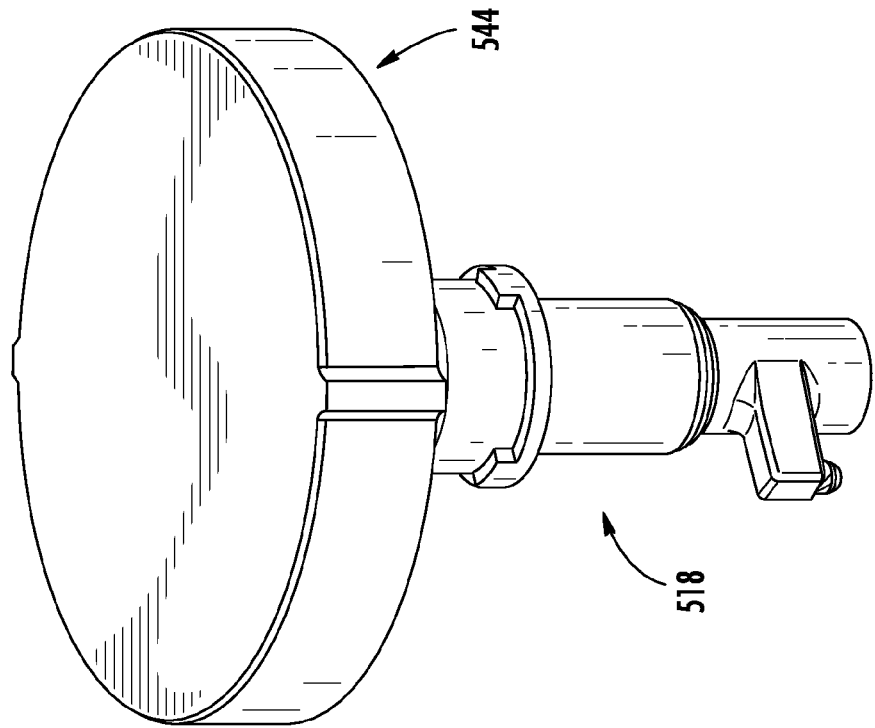
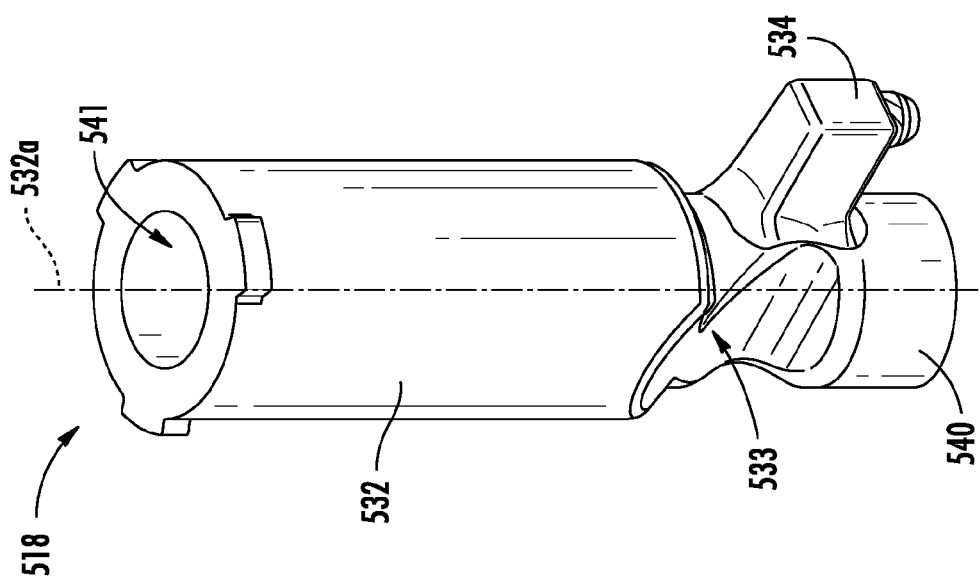

CABLE OVERLOAD DEVICE

CROSS-REFERENCE TO RELATED PATENT APPLICATIONS

This application claims the benefit of and priority to U.S. Provisional Patent Application No. 61/525,049, which was filed on Aug. 18, 2011. U.S. Provisional Patent Application No. 61/525,049 is incorporated by reference herein its entirety.

BACKGROUND

The present application relates generally to the field of drain systems for use in bathing tubs. More specifically, the present application relates to an improved drain system capable of being activated by either of interchangeable linear and rotary activators.

SUMMARY

One embodiment relates to a cable overload device for a cable-actuated drain system that includes a drain valve assembly and a drain control assembly where the cable includes a driving end connected to the control assembly and a driven end. The overload device includes a plunger, a linking member, a sleeve, and an energy absorber. The plunger is configured to be coupled to the driven end of the cable. The linking member is configured to move the drain valve assembly between open and closed positions. The sleeve includes a bore that extends from a first side to a second side of the sleeve, wherein the bore is configured to receive the plunger through the first side and to receive the linking member through the second side. The energy absorber is provided in the bore between the plunger and the linking member to absorb a force imposed into the linking member from the drain valve assembly.

Another embodiment relates to a drain valve system for a fixture, such as a bathing tub. The drain valve system includes a housing, a drain stopper, a lever, a cable, and a cable overload device. The housing is configured to mount to a wall of the fixture and includes an opening. The drain stopper is configured to move within the opening between an open position and a closed position. The lever is pivotally coupled to the housing and includes a first arm and a second arm, where the first arm is configured to move the drain stopper upon rotation of the lever. The cable includes a driven end and a driving end that is connected to a drain control assembly configured to move the cable. The cable overload device includes a plunger, a linking member, a sleeve, and an energy absorber. The plunger is coupled to the driven end of the cable. The linking member includes a first end and a second end coupled to the second arm of the lever, such that movement of the linking member rotates the lever. The sleeve includes a first side that receives the driven end and a second side that receives the linking member. The energy absorber is disposed between the plunger and the linking member to absorb a force imposed into the linking member from the drain stopper.

Yet another embodiment relates to a cable overload device for a cable-actuated drain system that includes a drain stopper and a control assembly. The overload device includes a cable, a linking member, a sleeve, and an energy absorber. The cable includes a driven end and a driving end connected to the control assembly, which is configured to move the cable. The linking member is configured to move the drain stopper between an open position and a closed position. The sleeve includes a first side that receives the driven end and a second side that receives the linking member. The energy absorber is provided between the driven end and the linking member to absorb a force imposed into the linking member from the drain stopper.

BRIEF DESCRIPTION OF THE DRAWINGS

FIGS. 8A and 8B are cross-sectional views of the housing of FIG. 8.

FIG. 15A is a perspective view of a rotary activated driving member for use in a control assembly, such as the control assembly of FIG. 12.

FIG. 15B is a perspective view of the driving member of FIG. 15A with a handle coupled thereto.

DETAILED DESCRIPTION

With general reference to the Figures, disclosed herein are improved drain systems for use in bathroom devices, such as bathing tubs, that generally may include drain valve assemblies configured to switch between open and closed positions in order to permit or prohibit water from flowing through the drain valve, such as from the basin of the tub. The drain systems may also include control assemblies that are configured to control the opening and closing of the drain valve assemblies through manipulation of an actuator by the user. The control assemblies may be configured to receive different types of actuators that have similarly configured key-way engaging features (or members) to provide flexibility to the user to select a preferred method of actuation without having to replace the portion of the control assembly that is coupled to the bathroom device. For example, the user has the option to utilize (or switch between) a linearly manipulated actuator or a rotary manipulated actuator for controlling the drain valve position through the control assembly. Further the different actuators may be switched without having to enlist the services of a professional and without the use of tools. The drain systems may further include cable assemblies that communicate between the control assemblies and the drain valve assemblies to control the operation thereof. The cable assemblies may be incorporated with an overload device or assembly to prevent damage to the drain system (e.g., the cable assembly), such as in the event a user steps on an open drain valve. Additionally, the drain valve systems disclosed herein may include aesthetic escutcheons, that may be easily replaced by the user without having to replace any of the hardware (e.g., the control assemblies, the drain valve assemblies) to allow the user to tailor the aesthetics of the drain valve systems, such as to match other fixtures in the bathroom, without the cost and difficulty of replacing the hardware of the systems.

Figure 1:
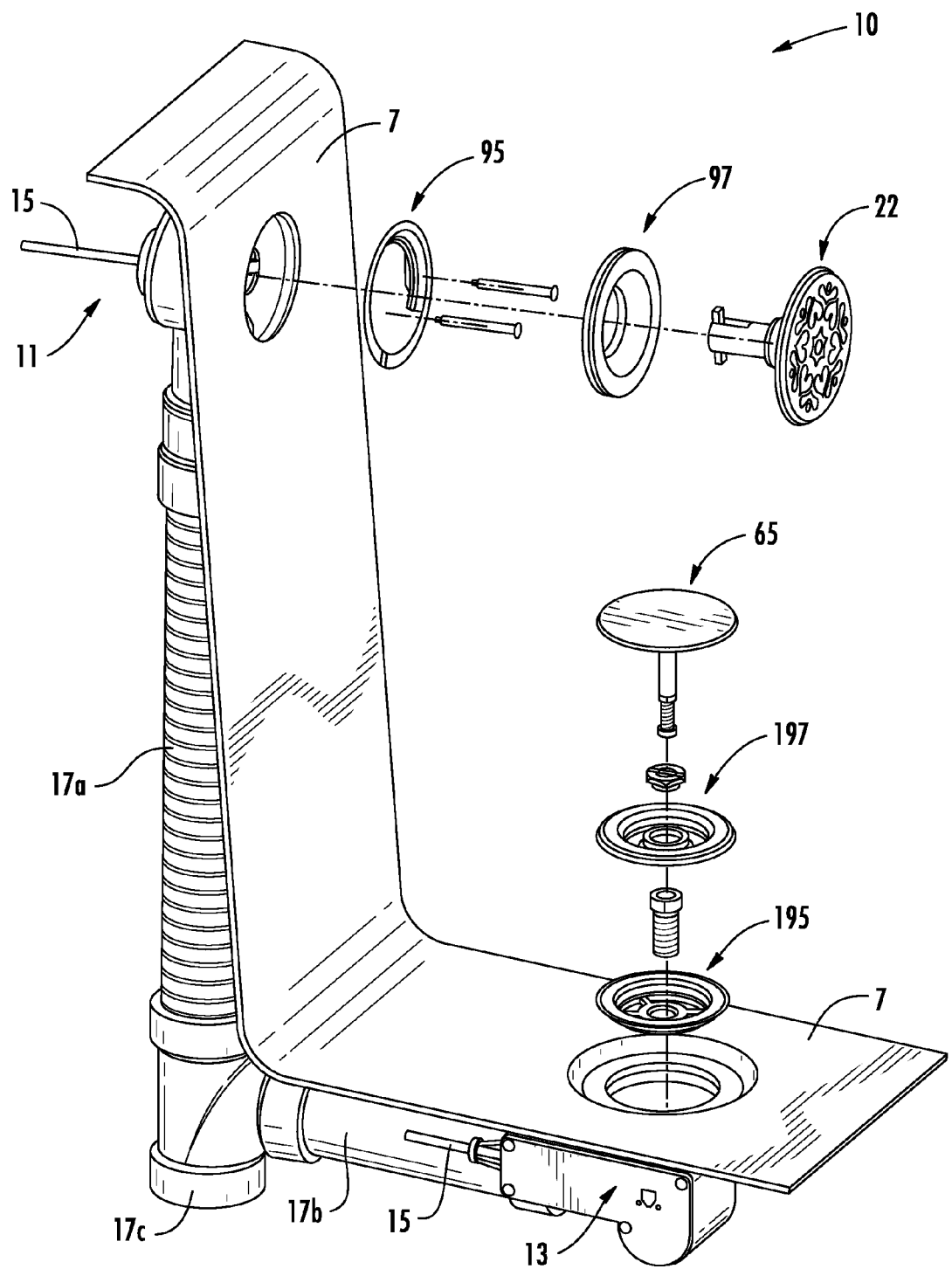
FIG. 1 is a perspective view of a drain system, according to an exemplary embodiment.
Figure 2:
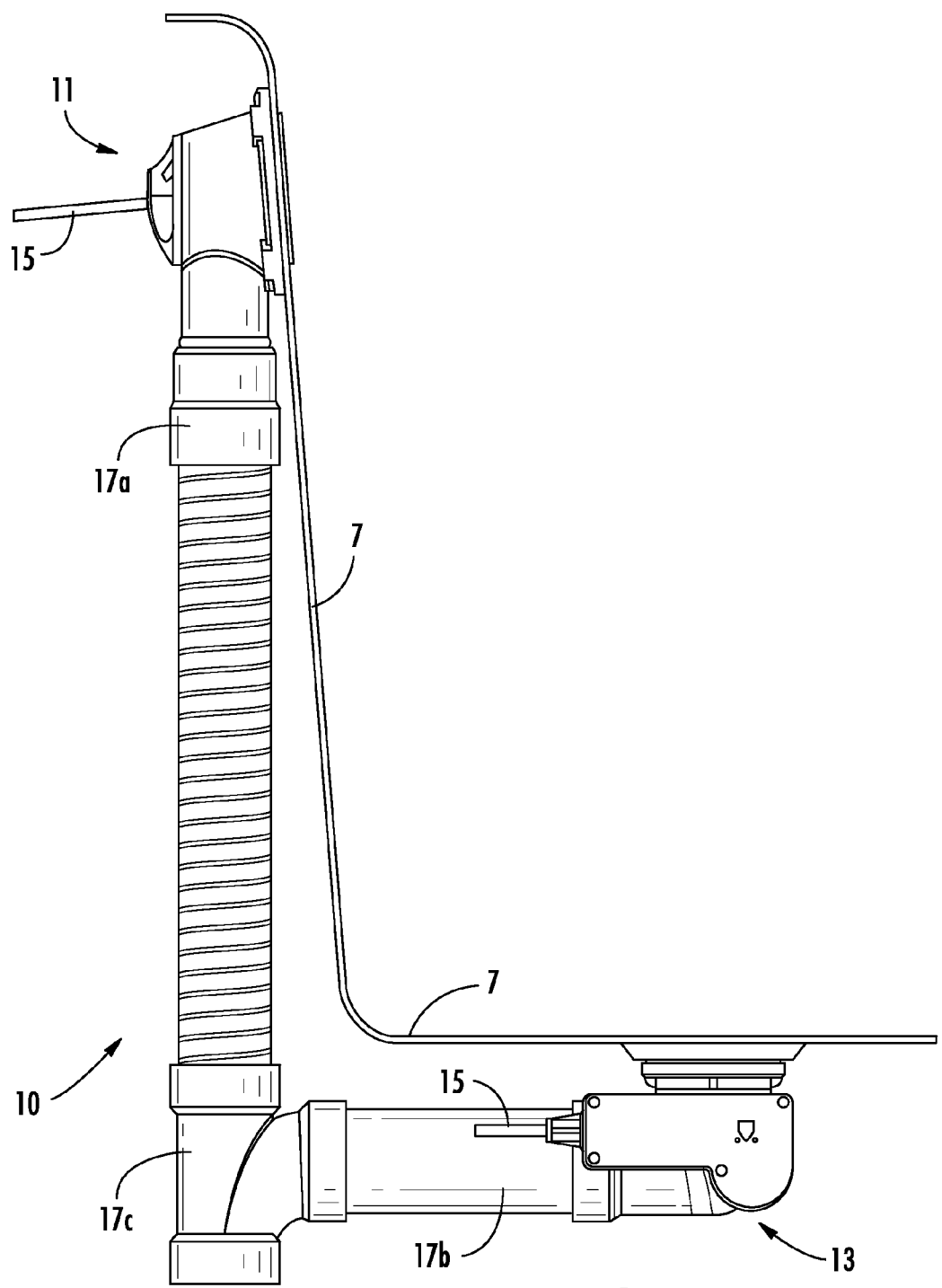
FIG. 2 is a side view of the drain system of FIG. 1.

FIGS. 1 and 2 illustrate an exemplary embodiment of a drain system 10 that generally includes a control assembly 11, a drain valve assembly 13, and a cable assembly 15. The cable assembly 15 is configured to communicate an input to the control assembly 11, such as by a user, to control the operation of the drain valve assembly 13. The drain system 10 may be utilized within a bathroom device, such as a bathing tub, for controlling the opening and closing of the drain valve assembly 13 through manipulation of the control assembly 11. In the open position, the drain valve assembly 13 permits liquid (e.g., water) to flow through the drain valve assembly 13 to exit the bathing tub. In the closed position, the drain valve prohibits liquid (e.g., water) from flowing through the drain valve assembly 13, thereby retaining the liquid in the basin of the bathing tub, such as to provide a bathing feature to the user of the tub.

The drain system 10 may also include one or more drainpipes 17 to carry or transfer the water from the drain system 10 to the sewer system or another component (e.g., plumbing) of the sewer system. For example, the drain system 10 may include a first drainpipe 17a and a second drainpipe 17b, where the first drainpipe 17a is in fluid communication with the overflow drain to transfer the water that enters the overflow drain and where the second drainpipe 17b is in fluid communication with the drain valve assembly 13 to transfer the water that enters the drain valve assembly 13. The first drainpipe 17a and the second drainpipe 17b may meet, such as at an elbow connection, to be in fluid communication with each other and the drainpipe 17c, which may transfer the water to the sewer system. Accordingly, water that enters either the first or second drainpipes 17a, 17b may exit through drainpipe 17c.

FIGS. 3-10A illustrate an exemplary embodiment of the control assembly 11 (e.g., a drain control assembly). The control assembly 11 is shown as including a housing 20, a switching mechanism 21, and an actuator 22 configured to selectively engage the housing 20 and to control the switching mechanism 21. For example, the control assembly 11 may include a receiving member 24 that is disposed within the housing 20 and is configured to receive the actuator 22. The receiving member 24 may be formed separately from the housing 20 then coupled thereto or may be integrally formed with the housing 20. When engaged with the receiving member 24 in the housing 20, the actuator 22 is configured to be moved between a first position (e.g., open position), as shown in FIG. 5B, and a second position (e.g., closed position), as shown in FIG. 5A, to correspondingly move the drain valve assembly 13 between a first open position and a second closed position through the cable assembly 15.

Figure 3:
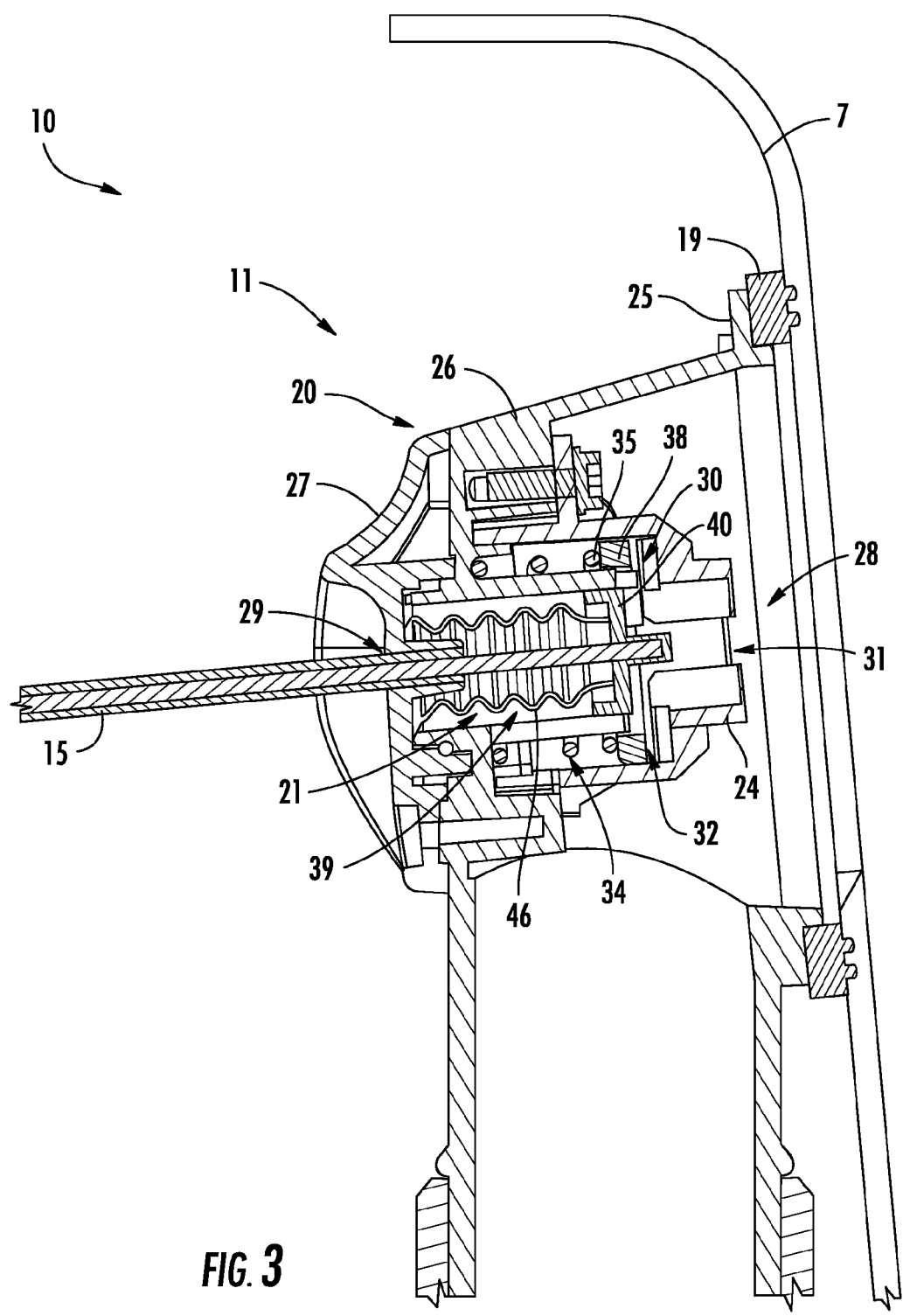
FIG. 3 is cross-sectional view of the control assembly of the drain system, shown without the actuator engaging the housing.
Figure 5A:
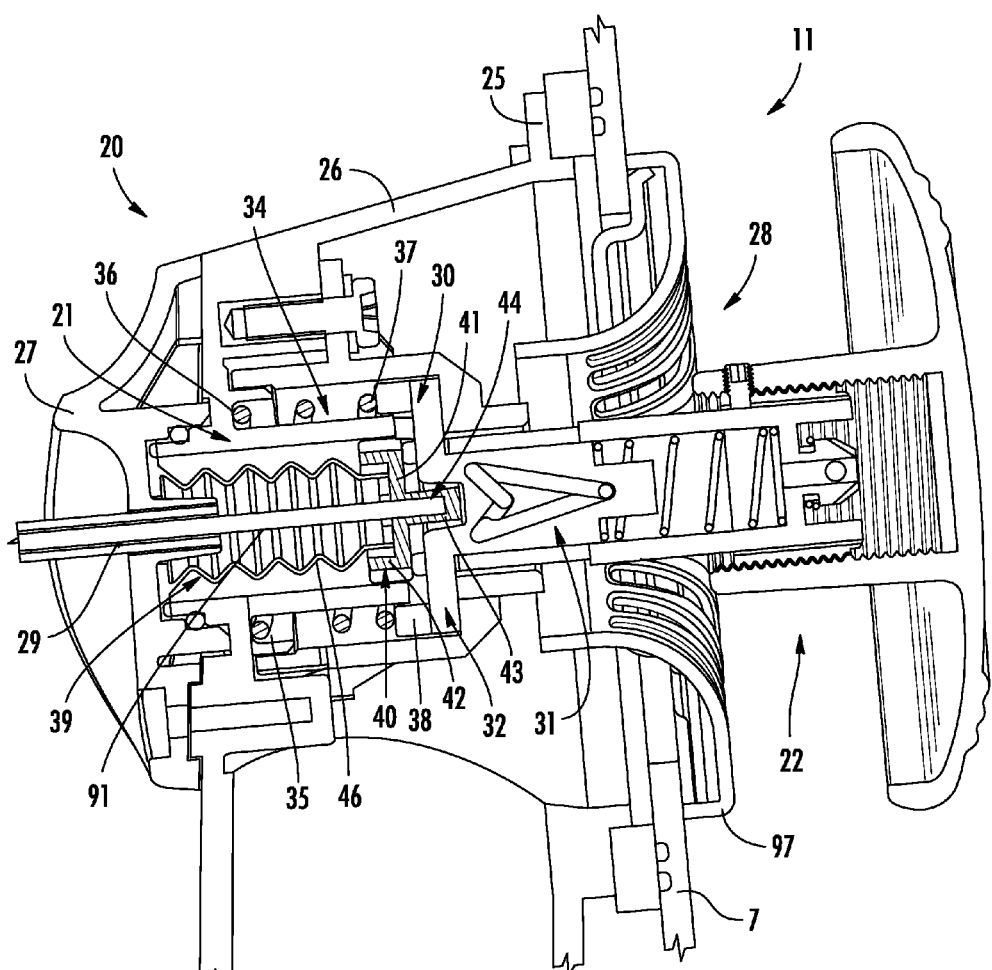
FIG. 5A is a cross-sectional view of the control assembly of FIG. 2 with the actuator engaging the housing in a closed position.
Figure 5B:
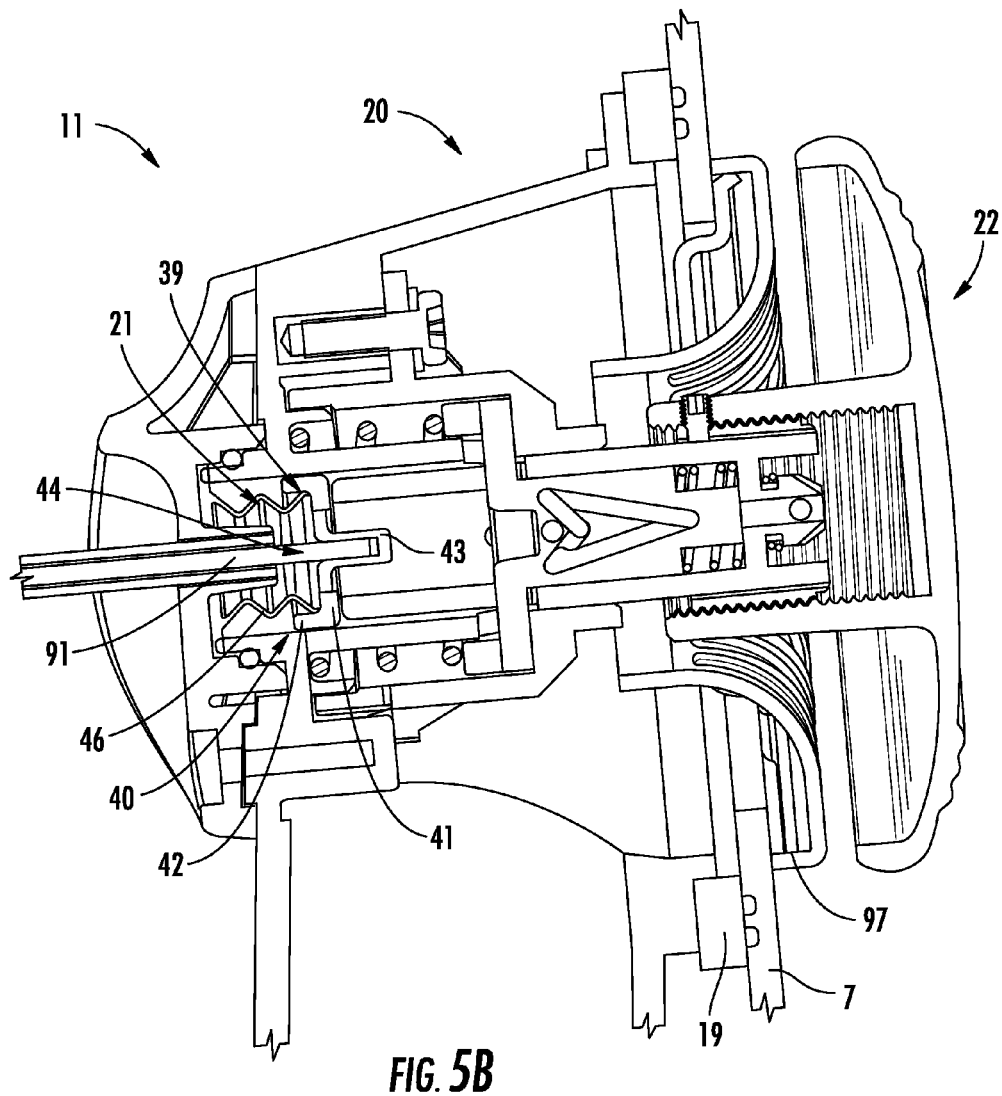
FIG. 5B is a cross-sectional view of the control assembly of FIG. 2 with the actuator engaging the housing in a open position.

As shown in FIGS. 3, 5A, 5B, the housing 20 may include a mounting base 25 for fixing the housing 20 in place, such as to a wall 7 of the bathing tub or any suitable bathroom fixture. The housing 20 may also include an outer wall 26 that extends from the base 25 and a rear portion 27 that extends from the outer wall 26, whereby the outer wall 26 and the rear portion 27 may enclose a switching mechanism 21 provided in the housing 20. The base 25 may include a stepped annular portion that may be configured to be inserted into a hole in the wall of the tub to thereby engage the wall 7. The annular base 25 may include a central opening 28 in which the actuator 22 may pass therethrough to engage a retaining channel 30 (e.g., a receiving portion) formed in the housing 20. The base 25 may further include one or more openings or apertures, such as on the annular portion, for receiving fasteners to couple the housing 20 to the bathroom fixture. The rear portion 27 may include an opening 29 that is configured to receive a portion of the cable assembly 15. The opening 29 may be provided in the back of the rear portion, along the sides, or may be located anywhere on the rear portion 27. In other words, the cable assembly 15 may extend in a rearward direction out the back of the housing 20 through the opening 29 in the rear portion 27 or may extend in a direction that is transverse to the rearward direction out the sides, top, or bottom of the rear portion 27 (or the housing 20).

The retaining channel 30 of the housing 20 is configured to receive and retain the actuator 22 to thereby permit manipulation of the actuator 22 by a user to control the switching mechanism 21. The retaining channel 30 may include an opening 31 that receives the actuator 22 or a portion thereof.

Figure 8:
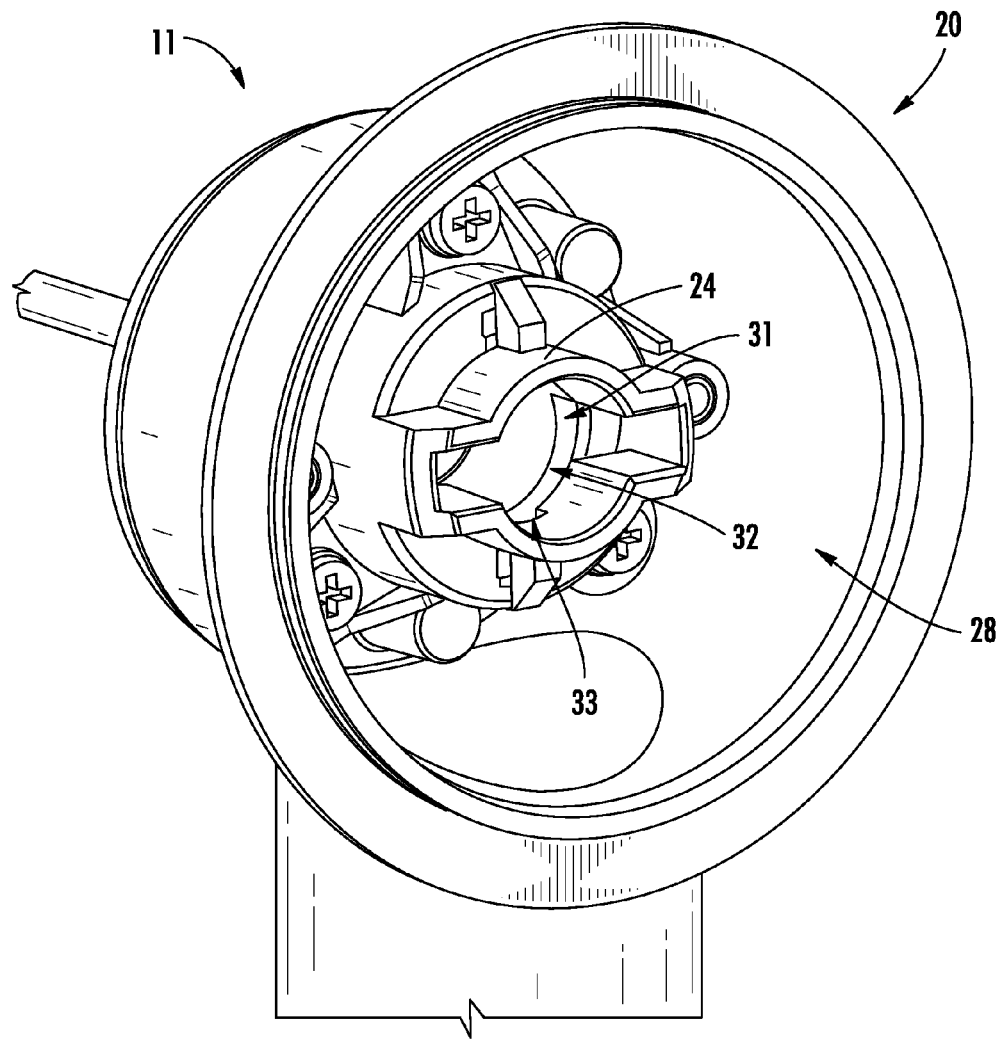
FIG. 8 is a perspective view of an exemplary embodiment of a housing of the control assembly.

Accordingly, the shape of the opening 31 may be varied and may be tailored to accommodate the shape of the actuator 22 (or portion of the actuator 22), which may also be varied. As shown in FIGS. 8-8B, the opening 31 may include a circular portion and two opposing rectangular portions extending from the circular portion. The retaining channel 30 may also include a passage 32 that extends from the opening 31 to allow the portion of the actuator 22 that is inserted through the opening to move through the passage 32. The passage 32 may be helical shaped, where upon rotation or twisting of the actuator 22 the portion of the actuator 22 that engages the retaining channel 30 moves along the passage 32 to a retaining position where the actuator 22 is selectively locked into engagement with the receiving member 24 in the housing 20. The actuator 22 may be configured to selectively lock into engagement with the receiving member 24 upon a predetermined angular rotation, such that to unlock the actuator 22 from the housing 20 a threshold force needs to be applied to the actuator (e.g., a compression force). The retaining channel 30 may include a recess 33 at the end of the rotational travel that is offset from the helical passage 32 in the direction that is opposite the direction the actuator 22 is inserted into engagement with the housing 20. For example, the recess 33 may be in the form of a fore and aft extending cutout that is configured to receive and retain a portion (e.g., the member 155, 255) of the actuator.

The control assembly 11 may include a biasing member 35 provided in the housing 20 to provide a force to bias the portion of the actuator 22 that engages the retaining channel 30 of the housing 20 into the recess 33 to lock the actuator 22 and the housing 20. The biasing member 35 may be a spring, such as a coil spring or helical spring that may provide the force when compressed in an axial direction. The biasing member 35 may be located in a cylindrical bore 34 within the housing 20, where the bore 34 is configured to retain the biasing member 35 in place, such as by limiting movement of the biasing member 35 in a direction that is transverse to the axial direction, but allows for the biasing member 35 to move (e.g., compress, expand) in the axial direction. The biasing member 35 may include a first end 36 and a second end 37, where the first end 36 engages the bore 34 of the housing 20 to limit travel of the biasing member 35 and the second end 37 is configured to apply the biasing force to the actuator 22 directly or indirectly (such as through an intermediate member).

The control assembly 11 may further include a seal or gasket 19 to prohibit the leaking of water. As shown in FIG. 3, the gasket 19 may be provided between the base 25 of the housing 20 and the wall 7 of the bathing tub to prohibit the leaking of water therebetween. For example, the gasket 19 may be generally annular shaped to reside in an annular shaped groove formed between the base 25 and the wall 7. However, the gasket may be provided at any suitable location and may be configured to have any suitable shape. Additionally, the control assembly 11 may include a plurality of gaskets.

When the actuator 22 is inserted into the retaining channel 30 of the housing 20, the biasing member 35 is compressed by the actuator 22 storing energy within the biasing member 35. When the actuator 22 is twisted the predetermined angular rotation, such that the engaging features of the actuator 22 are aligned with the recess 33, the biasing member 35 releases stored energy to bias the engaging features of the actuator 22 into the selectively locked position with the recess 33. To unlock the actuator 22 from the housing 20, the user applies enough force (e.g., a compression force of around 20 lbs) to overcome the biasing force of the biasing member 35 that retains the engaging features (e.g., the member 155, 255) of the actuator 22 into the recess 33, which moves the engaging features into alignment with the passage 32 where the user can disengage the actuator 22 from the housing 20 through rotation of the actuator 22.

The control assembly 11 may also include a washer 38 provided as an intermediate member between the second end 37 of the biasing member 35 and the actuator 22. The washer 38 may be configured to slide along the cylindrical bore 34 of the receiving member 24 in the housing 20 when a force is applied on the washer 38, such as from the biasing member 35 and/or from the actuator 22. The washer 38 may be cylindrical or annular shaped, such as to fit in the cylindrical bore, or may have any suitable shape to tailor the shape of the washer to the shape of the bore.

The switching mechanism 21 is configured to move a driving end 91 of the cable assembly 15 between the first open and second closed positions, upon activation by the actuator 22. The switching mechanism 21 may include a sliding member 40 that is configured to move the driving end 91 of the cable assembly 15 when the actuator 22 is activated. Thus, the sliding member 40 is configured to move (e.g., slide) in a bore of the receiving member between a first and a second position, which correspond to the first and second positions of the switching mechanism 21. The sliding member 40 may receive and/or may be coupled to the driving end 91 of the cable assembly 15, such that movement of the sliding member 40 results in a corresponding movement of the driving end 91 of the cable. As shown in FIGS. 5A and 5B, the sliding member 40 may have an annular base 41, an annular wall 42 that extends from the annular base 41, and a cylindrical portion 43 that extends from the annular base 41. The cylindrical portion 43 may include a bore 44 that is configured to receive the driving end 91 of the cable. The sliding member 40 and the driving end 91 of the cable may be coupled together using any suitable method, such as crimping. The cylindrical portion 43 may extend a length beyond the annular base 41 to allow for enough length between the driving end 91 of the cable and the sliding member 40 to provide a good crimp or couple.

The sliding member 40 of the switching mechanism 21 may be configured to be received within a second bore 39 in the receiving member 24 in the housing 20. The wall of the housing 20 that defines the second bore 39 may be configured to guide the sliding member 40 during movement within the second bore 39 to allow for efficient relative movement between the housing 20 and the sliding member 40.

The switching mechanism 21 may further include a seal 46 to prevent the exposure of the driving end 91 of the cable to water. The seal 46 may preferably have a bellows shape, as shown, to accommodate the movement (e.g., compression, expansion) induced by the sliding member 40. However, the seal 46 may have any suitable shape that may prohibit the ingress of water and accommodate the movement. The seal 46 may be disposed in the second bore 39 in the receiving member 24 to enclose or partially enclose the driving end 91 of the cable. The bellows shaped seal 46 may be resilient, such that the seal 46 may be compressed by the sliding member 40 when the sliding member 40 is moved toward the seal 46, yet the seal 46 springs back to an uncompressed state when the sliding member 40 is moved away from the seal 46. Thus, the resilient seal 46 may provide a force to bias the sliding member 40, such as into the first open position. The housing 20 (e.g., the rear portion 27) may include a protrusion that guides the cable and further provides a lip for an end of the seal 46 to engage (e.g., contact) to prevent ingress of water beyond the seal 46. The protrusion may be configured to retain the end of the seal 46. The other end of the seal 46 may engage (e.g., contact) the sliding member 40.

Figure 4:
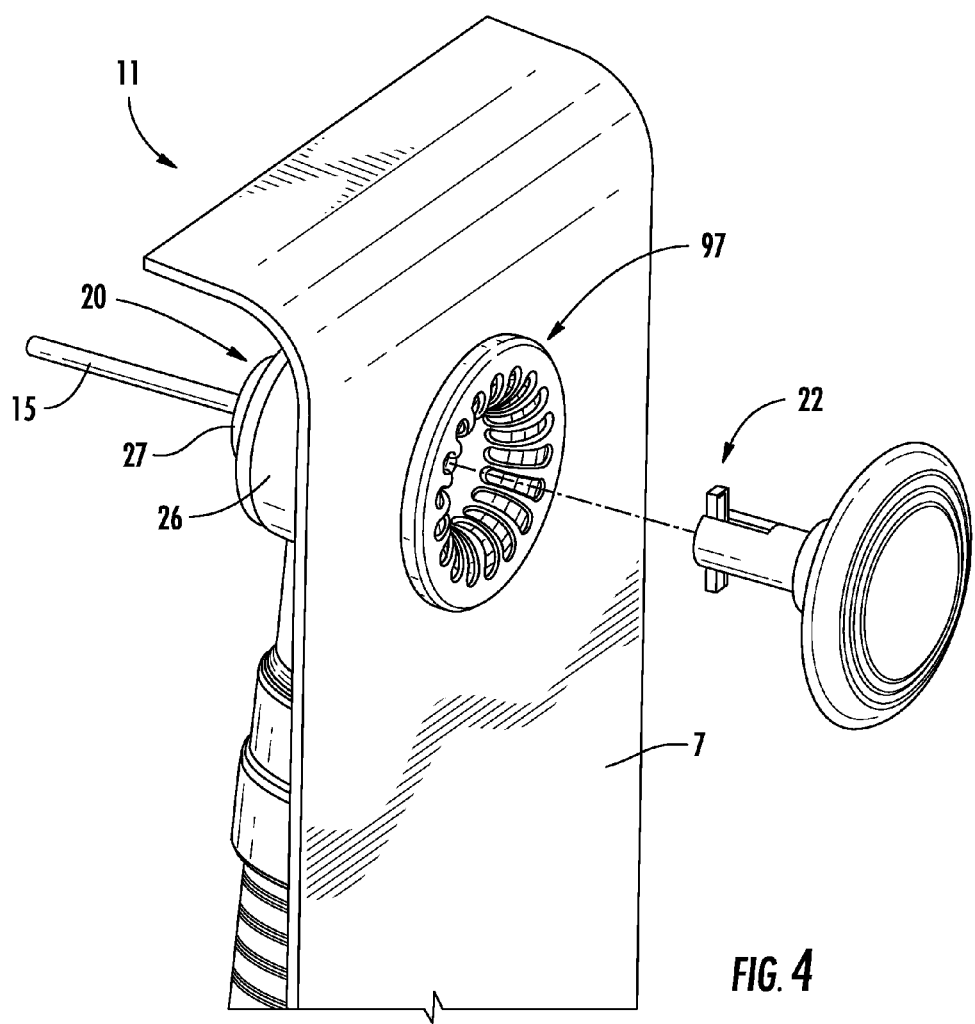
FIG. 4 is a perspective view showing the actuator being moved into engagement with the housing of the control assembly.

The housing 20 and the switching mechanism 21 together form an assembly (e.g., a rough-in assembly, a kit, subassembly, etc.), which provides the function of the control assembly 11. As shown in FIGS. 1 and 4, an escutcheon 97 (e.g., faceplate) may be coupled to the control assembly 11 to provide improved aesthetics to the drain system, whereby the aesthetics may be tailored to accommodate customer preference by switching out escutcheons. The escutcheon 97 is discussed in greater detail below.

Additionally, the housing 20 of the control assembly 11 may be configured to act as the overflow for the drain system 10, where the housing 20 may further include a drainpipe 17a for draining water that enters the overflow opening. The central opening 28 in the base 25 of the housing 20 may be the overflow opening, such that when the water in the tub rises to a level that is above the central opening 28, the water enters the central opening 28 and passes into the drainpipe 17a to be carried to the sewer system. It should be noted that the control assembly 11 may be configured to include an overflow opening that is separate from the central opening 28, where the overflow opening may be configured in any suitable manner (e.g., shape, location, size, etc.).

The housing 20 of the control assembly 11 may be configured to receive both a clicker cartridge actuator 122, whereby the actuator 122 is activated through linear manipulation by the user, and a rotary cartridge actuator 222, whereby the actuator 222 is activated through rotary manipulation by the user. Thus, the control assembly 11 provides the flexibility for the user to change the method of actuation of the drain system without having to replace or modify the rough-in assembly. Accordingly, the user can tailor the actuation of the drain system 10 to his or her own preferred method of actuation (e.g., linear, rotary), such as by simply switching between the actuator 122 and the actuator 222. In addition, the drain systems disclosed herein allow for the user to tailor such actuation without having to rely on a professional to perform such a service. In fact, the user can switch the actuation method (e.g., the actuators) without the need of a tool or device to assist the user.

Figure 6A:
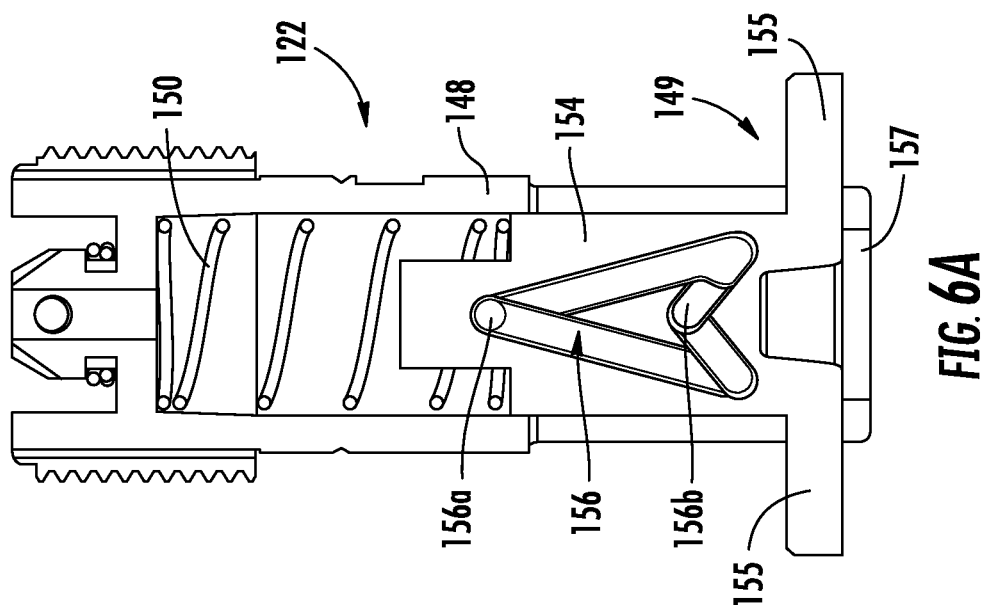
FIG. 6A is a cross-sectional-view of the actuator of FIG. 5.
Figure 6:
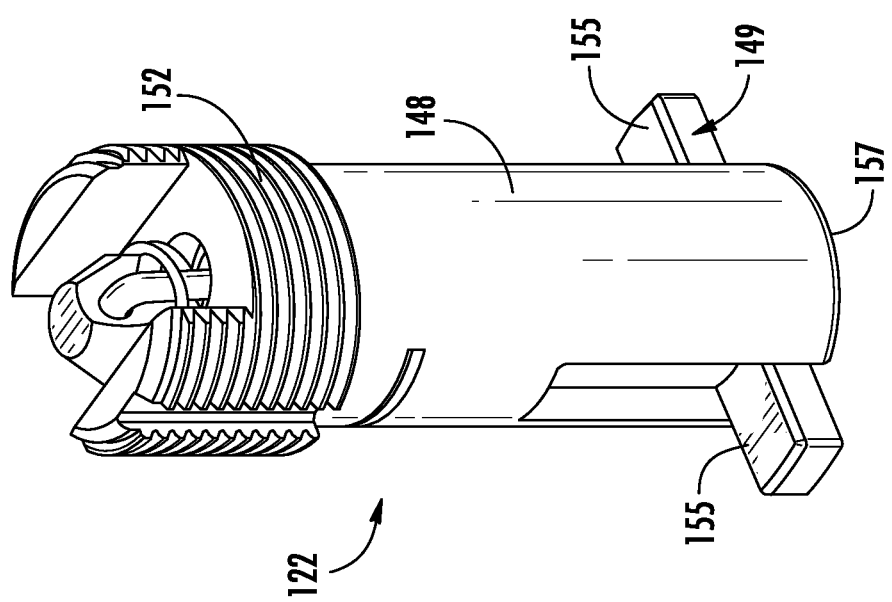
FIG. 6 is a perspective view of an exemplary embodiment of a clicker cartridge actuator.

FIGS. 6 and 6A illustrate actuator 22, according to an exemplary embodiment, shown as a clicker cartridge actuator 122 to selectively engage the receiving member 24 in the housing 20 and to control the switching mechanism 21 of the control assembly 11. When engaged with the receiving member 24, the actuator 122 may be moved between a first open position and a second closed position through linear manipulation of the actuator 122. In the open position, the actuator 122 moves the drain valve assembly 13 to an open position through the switching mechanism 21 and the cable assembly 15, where water may drain through the drain valve assembly 13 from the bathing tub. In the closed position, the actuator 122 moves the drain valve assembly 13 to a closed position through the switching mechanism 21 and the cable assembly 15, where water is prohibited from draining through the drain valve assembly 13 and therefore accumulates in the bathing tub. In other words, when linearly moved between the first and second positions, the actuator 122 in turn moves the sliding member 40 of the switching mechanism 21 between first and second positions, which in turn moves the driving end 91 of the cable assembly 15 between first and second positions to open and close the drain valve assembly 13.

The actuator 122 may include a body 148, an engaging feature 149, and a biasing member 150 that together may form a cartridge unit. The actuator 122 may further include a handle 151 that is configured to engage the body 148. The body 148 may be configured as a hollow cylinder that is open on one end to receive the engaging feature 149 and the biasing member 150 through the opening. The body 148 may include a coupling feature 152, such as a threaded portion, for coupling the handle 151 thereto. The coupling feature 152 may be provided on the end of the body 148 that is opposite the open end. The body 148 may have a contact surface 157 (e.g., on the open end of the body) that is configured to contact the sliding member 40 of the switching mechanism 21, such that motion of the body 148 relative to the engaging feature 149 in turn moves the sliding member 40. The engaging feature 149 may include cylindrical portion 154 configured to slide within the hollow body 148 and a pair of members 155 that extend from opposing sides of the portion 154. The member 155 may be any suitable shape, such as rectangular, to define a key-way that engages the opening 31 of the housing 20. Upon rotation of the actuator 122, the members 155 move along the passage 32 of the receiving member 24 in the housing 20 to selectively lock in the recess 33 to selectively engage the actuator 122 and the housing 20 (e.g., receiving member 24).

The engaging feature 149 of the actuator 122 may also include a locking feature 156 that may selectively lock the actuator 122 into position, such as the first and/or second positions. As shown in FIG. 6a, the locking feature 156 may take the form of an A-shaped travel guide, wherein a pin coupled to (or an protrusion extending from) the body 148 may pass therein. When the actuator is configured in the second closed position, as shown in FIG. 5A, the pin of the body 148 resides in the upper apex 156a of the A-shaped travel guide 156. When the body 148 of the actuator 122 is depressed (or compressed or moved) toward the engaging feature 149, the actuator may move from the second closed position to the first open position, as shown in FIG. 5B, where the pin of the body 148 travels along the leg of the A-shaped travel guide 156 to a lower corner, then upward along the base at an oblique angle to reside in the lower apex 156b. When depressed (or activated), the body 148 moves relative to the engaging feature 149, since the engaging feature 149 is retained by the housing 20. To move the actuator back to the second closed position from the first open position, the body 148 is depressed (or compressed) thereby moving the pin of the body 148 along the base to a lower corner, then upward along the leg to the upper apex 156a. Thus, the actuator 122 is configured to move between the first and second positions through linear manipulation of the actuator 122 by the user, such as by linear motion of the body 148 relative to the engaging feature 149. Further, when the actuator 122 is moved between the first and second positions, the contact surface 157 of the body 148 is configured to move the sliding member 40 of the switching mechanism 21 between corresponding first and second positions. It should be noted that the configuration of the locking feature 156 and/or the engaging feature 149 may be varied, and the embodiments disclosed herein are not limiting.

The biasing member 150 may be a spring (e.g., a coil spring, a helical spring, etc.) provided within the hollow cylinder of the body 148 between the engaging feature 149 and the body 148 to impart a biasing force that may act to move the body 148 and the engaging feature 149 in opposing directions. Thus, the force from the biasing member 150 may act to retain the pin of the body 148 within the upper apex 156a or the lower apex 156b to lock the actuator 122 into the respective closed position or open position.

As discussed above, the actuator 122 may be configured to be selectively coupled or engaged with the receiving member 24 in the housing 20. For example, the actuator 122 may be selectively coupled to receiving member 24 through applying a compression force, such as 20 lbs, in the direction of coupling or engagement. The compression force may drive the engaging feature 149 of the actuator 122 to be selectively coupled to the receiving member 24 (e.g., the passage 32 and the recess 33). When engaged with the receiving member 24, a user may actuate the actuator 122 by applying an activation force, such as 10 lbs, in the direction of activation to switch the drain system between the open and closed positions. The difference in the force to activate and the force to couple the actuator allows for the directions of activation and engagement to be substantially similar (e.g., parallel) directions. However, it should be noted that the direction of activation may be configured to be different than the direction of engagement.

Figure 7A:
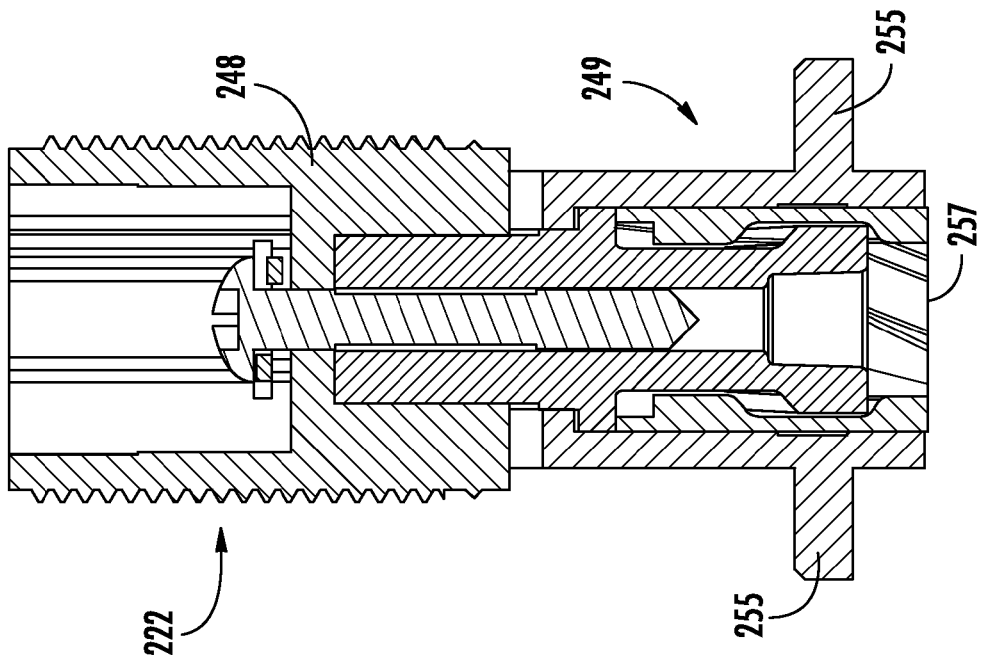
FIG. 7A is a cross-sectional view of the actuator of FIG. 6.
Figure 7:
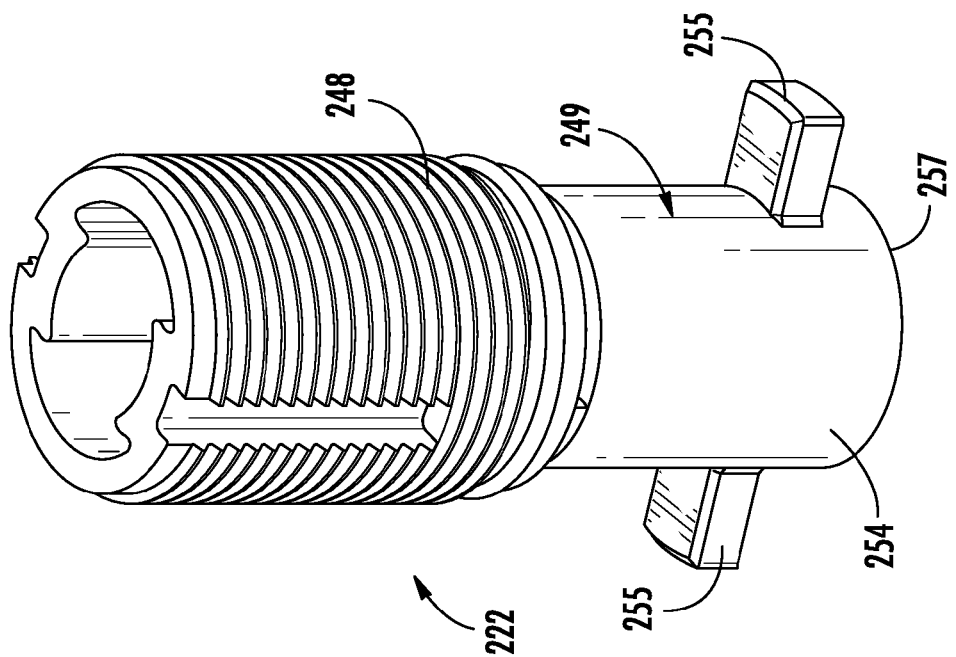
FIG. 7 is a perspective view of an exemplary embodiment of a rotary cartridge actuator.

FIGS. 7 and 7A illustrate actuator 22, according to another exemplary embodiment, shown as a rotary cartridge actuator 222 to selectively engage the receiving member 24 in the housing 20 and to control the switching mechanism 21 of the control assembly 11. When engaged with the receiving member 24, the actuator 222 may be moved between a first open position and a second closed position through rotational manipulation of the actuator 222. In the open position, the actuator 222 moves the drain valve assembly 13 to an open position through the switching mechanism 21 and the cable assembly 15, where water may drain through the drain valve assembly 13 from the bathing tub. In the closed position, the actuator 222 moves the drain valve assembly 13 to a closed position through the switching mechanism 21 and the cable assembly 15, where water is prohibited from draining through the drain valve assembly 13 and therefore accumulates in the bathing tub. In other words, when rotationally moved between the first and second positions, the actuator 122 in turn moves the sliding member 40 of the switching mechanism 21 between first and second positions, which in turn moves the driving end 91 of the cable assembly 15 between first and second positions.

The actuator 222 may include a body 248 and an engaging feature 249 that together may form a cartridge unit. The actuator 222 may further include a handle that is configured to engage the body 248. The body 248 may be configured to move relative to the engaging feature 249, such that rotational motion of the body 248 is converted into linear translation of the body 248 toward or away from (depending on the direction of rotation) the engaging feature 249. The engaging feature 249 may define a key-way having a cylindrical portion 254 with two members 255 extending therefrom, such as from opposing sides of the cylindrical portion 254. Upon rotation of the actuator 222, the members 255 move along the passage 32 of the receiving member 24 in the housing 20 to selectively lock in the recess 33 to selectively engage the actuator 222 and the receiving member 24.

The engaging feature 249 of the actuator 222 may also include a locking feature that may selectively lock the actuator 222 into position, such as in the first and/or second positions. The actuator 222 is configured to move between the first and second positions through rotational manipulation of the actuator 222 by the user, such as by rotational motion of the body 248 relative to the engaging feature 249. For example, when the body 248 is rotated in a first rotational direction (e.g., clockwise), the body 248 may move linearly toward the engaging feature 249, and when the body 248 is rotated in a second rotational direction (e.g., counter-clockwise), the body 248 may move linearly away from the engaging feature 249. The body 248 may include a contact surface 257, such that when the body 248 moves relative to the engaging feature 249 the contact surface 257 moves the sliding member 40 of the switching mechanism 21 a corresponding distance. Thus, rotational motion of the body 248 of the actuator 222 results in linear movement of the contact surface 257 of the actuator 222 and the sliding member 40 that is in contact with the contact surface 257.

The actuator 222 may further include a biasing member to provide a biasing force onto the actuator 222 or onto one or more portions thereof, such as between the body 248 and the engaging feature 249. The biasing member may be a spring (e.g., a coil spring) that imparts a biasing force, such as to act to move the body 148 and the engaging feature 149 in opposing directions, or may have any suitable configuration.

The actuators 122, 222 have similarly configured key-way features of the engaging features 149, 249 that are configured to engage the same (or common) receiving member 24 in the housing 20 and control the switching mechanism 21 therein. This allows the user to switch between the linearly activated actuator 122 and the rotary activated actuator 222 based on the user preference. This provides flexibility to the user to be able to have a preferred actuation method without having to replace or modify the rough-in assembly (e.g., the hardware coupled to the wall of the fixture) or without having to enlist the services of a professional, such as to change actuators.

Figure 9:
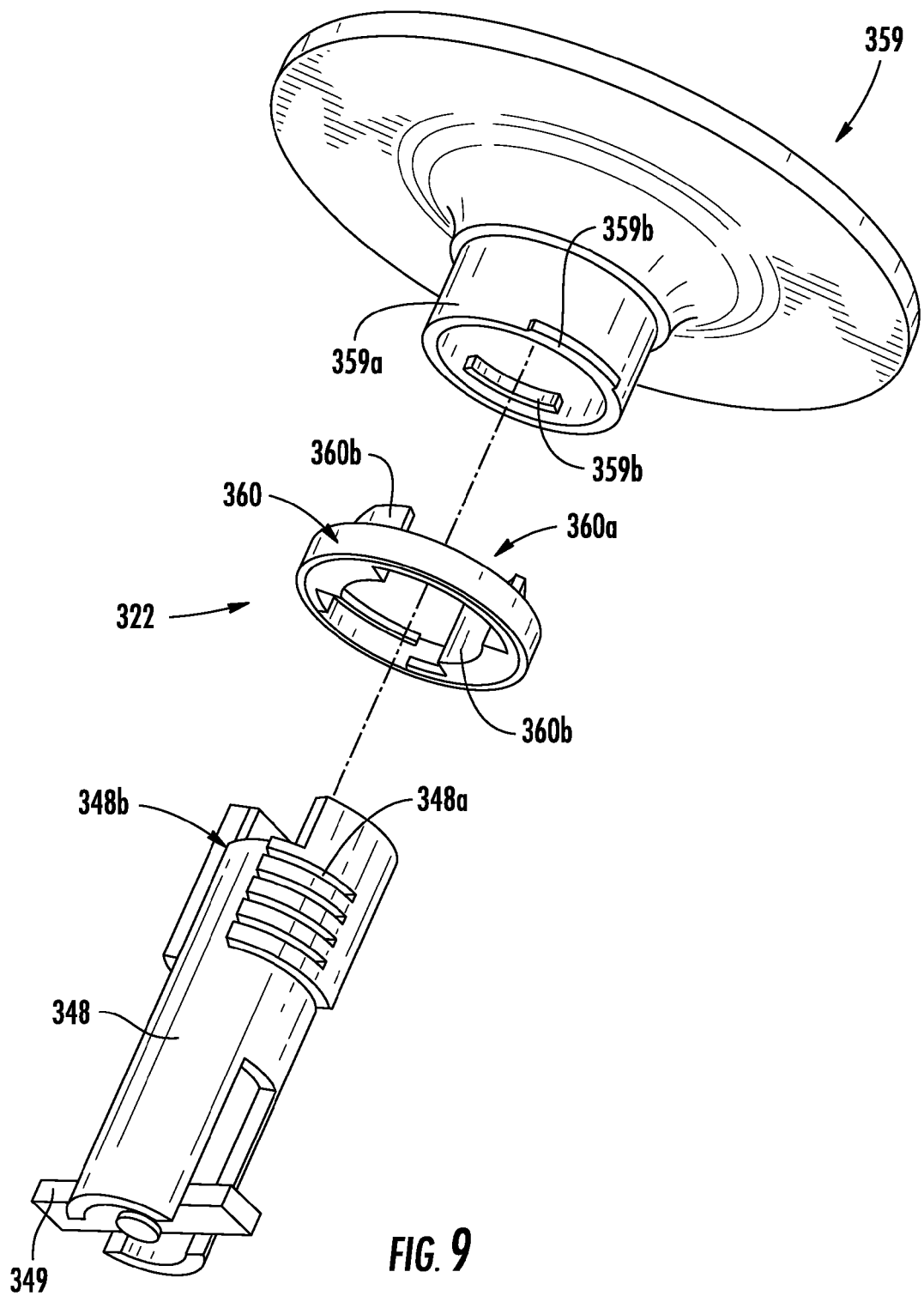
FIG. 9 is an exploded perspective view of an exemplary embodiment of an actuator.
Figure 10:
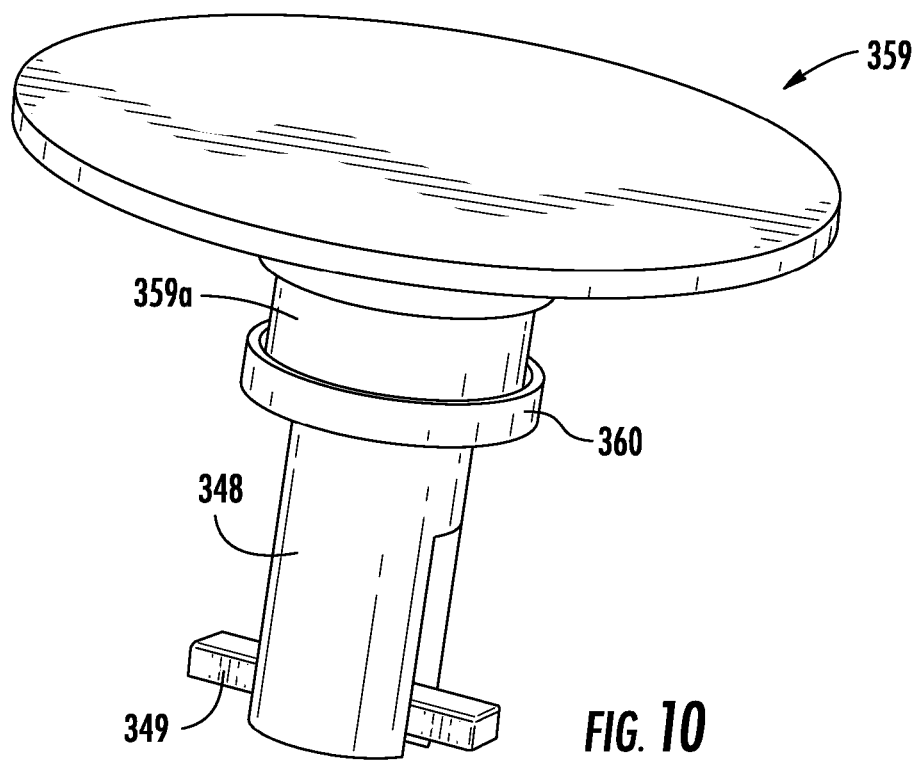
FIG. 10 is a perspective view of the actuator of FIG. 9.
Figure 10A:
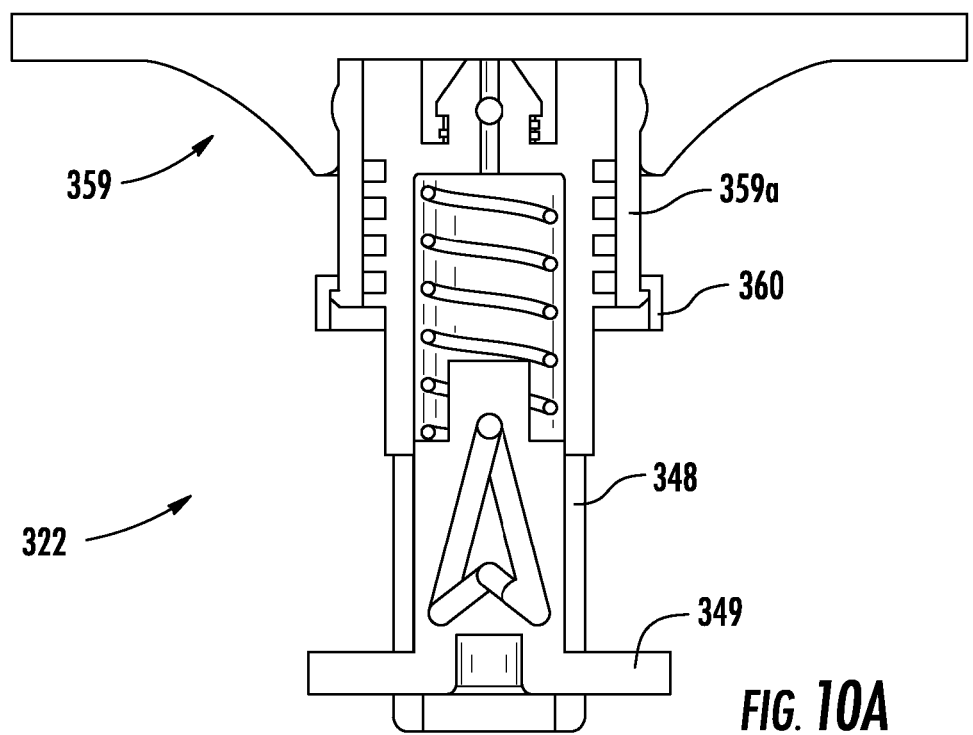
FIG. 10A is a cross-sectional view of the actuator of FIG. 10.
Figure 11:
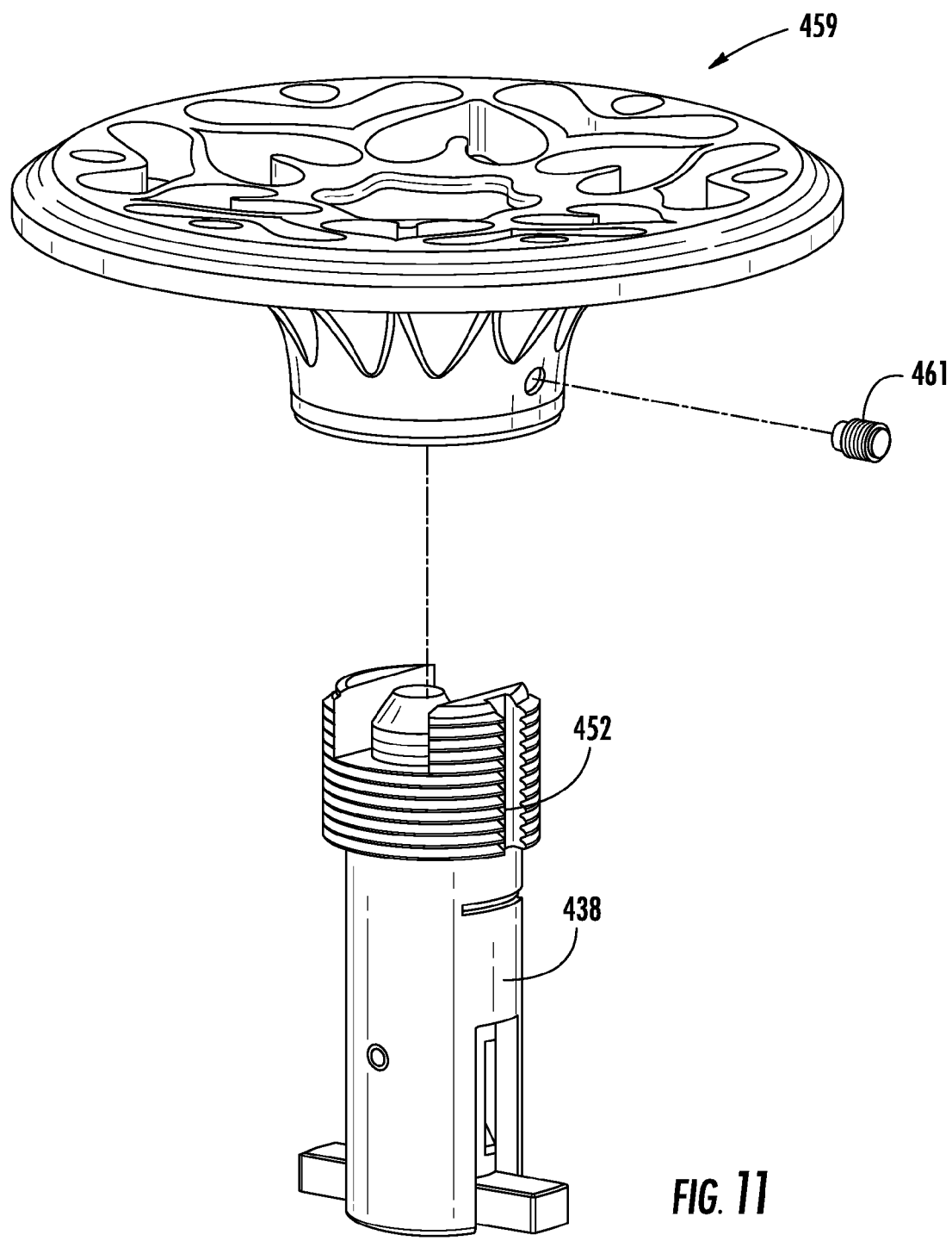
FIG. 11 is a perspective view of another exemplary embodiment of an actuator.

As shown in FIGS. 9-11, the actuator may be configured to include a handle that the user manipulates to move the actuator between the first and second positions. FIGS. 9-10A illustrate the actuator 22, according to another exemplary embodiment, shown as actuator 322. The actuator 322 may include a body 348 and an engaging feature 349 that together may form a cartridge unit. The actuator 322 may also include a handle 359 and a lock ring 360 to secure the handle 359 to the body 348 of the cartridge unit. The actuator 322 is configured to provide height adjustability (e.g., adjustment along the longitudinal axis of the body 348) of the handle 359 relative to the body 348 without the assistance of tools. Because the walls of the bathing tubs vary in thickness, the height adjustability of the actuator 322 allows a common actuator 322 to be used in conjunction with varying thickness tubs, while providing a proper fit between the tub and actuator 322.

The handle 359 may have any suitable shape and size, and may include a sleeve 359*a* that is configured to receive the lock ring 360 and/or the body 348 of the cartridge unit. The sleeve 359*a* of the handle 359 may include one or more threads 359*b* (e.g., ribs, projections, etc.) that are configured to secure the handle 359 to the lock ring 360 and/or the body 348. The threads 359*b* may extend outwardly from the outer surface of the sleeve 359*a*, may extend inwardly from the inner surface of the sleeve 359*a*, or may extend having a combination thereof. Each thread 359*b* may extend any suitable length, such as an arc length that is less than the full circumference of the sleeve 359*a*. For example, the sleeve 359*a* may include two threads 359*b* (e.g., outwardly extending threads), where each thread 359*b* extends only a portion of the circumference (e.g., about one-fifth to one-fourth of the total arc length). The lock ring 360 has an opening 360*a* that is similar to the shape and size defined by the sleeve 359*a* and threads 359*b* of the handle 359, so that the handle 359 may be inserted into the lock ring 360.

The body 348 of the actuator 322 may include external grooves 348*a* (e.g., threads, splines, protrusions) that are separated by one or more slots 348*b*. The lock ring 360 includes arms 360*b* that are configured to slide in the slots 348*b*, as the lock ring 360 moves (or slides) relative to the body 348. Accordingly, the coupled handle 359 and lock ring 360 are able to slide along the length of the body 348 of the actuator 322, as the arms 360*b* slide in the slots 348*b*, to provide height adjustability. Once the desired height of the handle 359 relative to the body 348 is achieved, the handle 359 may be rotated relative to both the lock ring 360 and the body 348, whereby the threads 359b of the handle 359 engage the grooves 348a of the body 348 to lock the position of the handle 359. The lock ring 360 may have an engaging feature (e.g., thread, recess, groove, channel, etc.) that receives the threads 359b when the handle is rotated. The arms 360b may also impart a retaining force to secure the handle 359 to the body 348 of the actuator 322.

Alternatively, as shown in FIG. 11, the handle 459 may include internal threads provided on an interior of the sleeve portion of the handle that screw over the external threads 452 of the body 438 to thereby couple the handle 459 and body 438 together. The actuator 422 may further include a set screw 461 (or other suitable fastening device) to secure the handle 459 to the body 438 to prevent inadvertent relative rotation about the engaged threads.

FIGS. 12-15D illustrate another exemplary embodiment of a control assembly 511 that is configured to move a cable 513 between a first position and a second position, such that the first position may correspond to a first open position of a drain valve assembly where the water is able to drain from the tub through the drain valve and the second position may correspond to a second closed position of the drain valve assembly where the water is prohibited from draining from the tub through the drain valve. The control assembly 511 is configured to provide flexibility to the user by allowing the user to change the method of actuation between rotary and linear input methods, such as by changing the driving member of the control assembly. In other words, the user can tailor the actuation method of the control assembly 511 by simply switching between a rotary activated driving member and a linear activated driving member.

The control assembly 511 includes a housing 520 that is configured to selectively receive both a first driving member 518 that is activated (e.g., controls the function of the drain valve assembly) through rotary movement and a second driving member 618 that is activated through linear movement. The control assembly 511 also includes a driven member 519 that is configured to be moved by the driving member 518, 618 to control the movement of the cable 513 between the first and second positions to control the function of the drain valve assembly. The housing 520 is configured to support the driving member 518 and/or the driven member 519.

Figure 12:
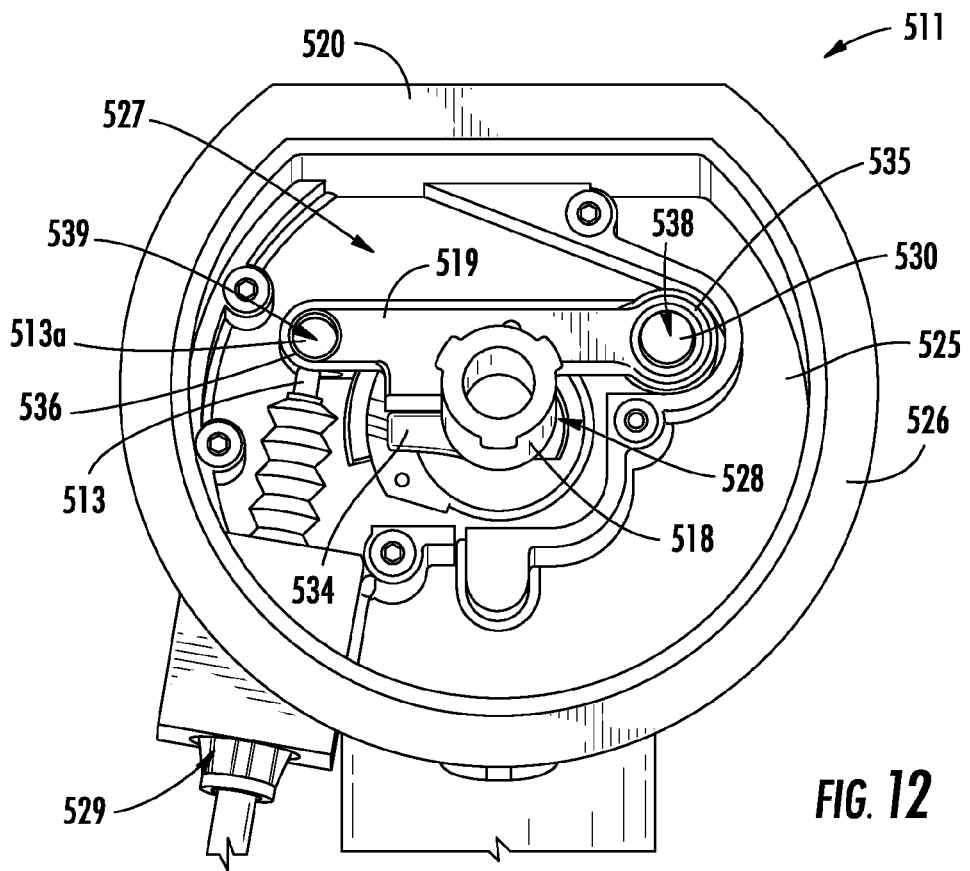
FIG. 12 is a perspective view of another exemplary embodiment of a control assembly having a rotary activated driving member engaged to the housing.
Figure 12A:
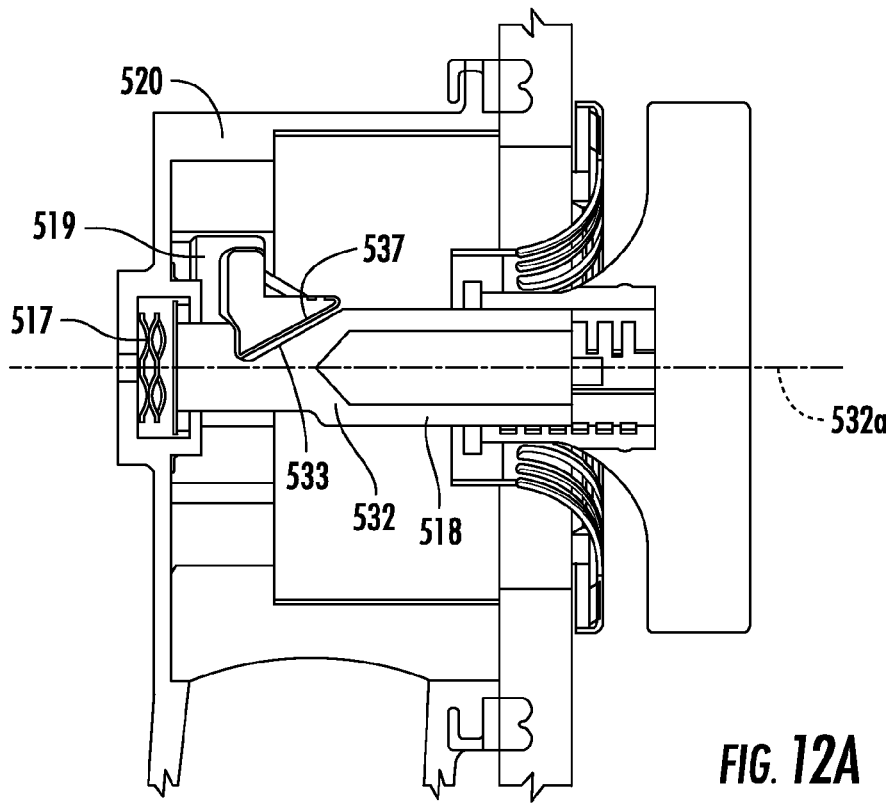
FIG. 12A is a cross-sectional view of the control assembly of FIG. 12.
Figure 12B:
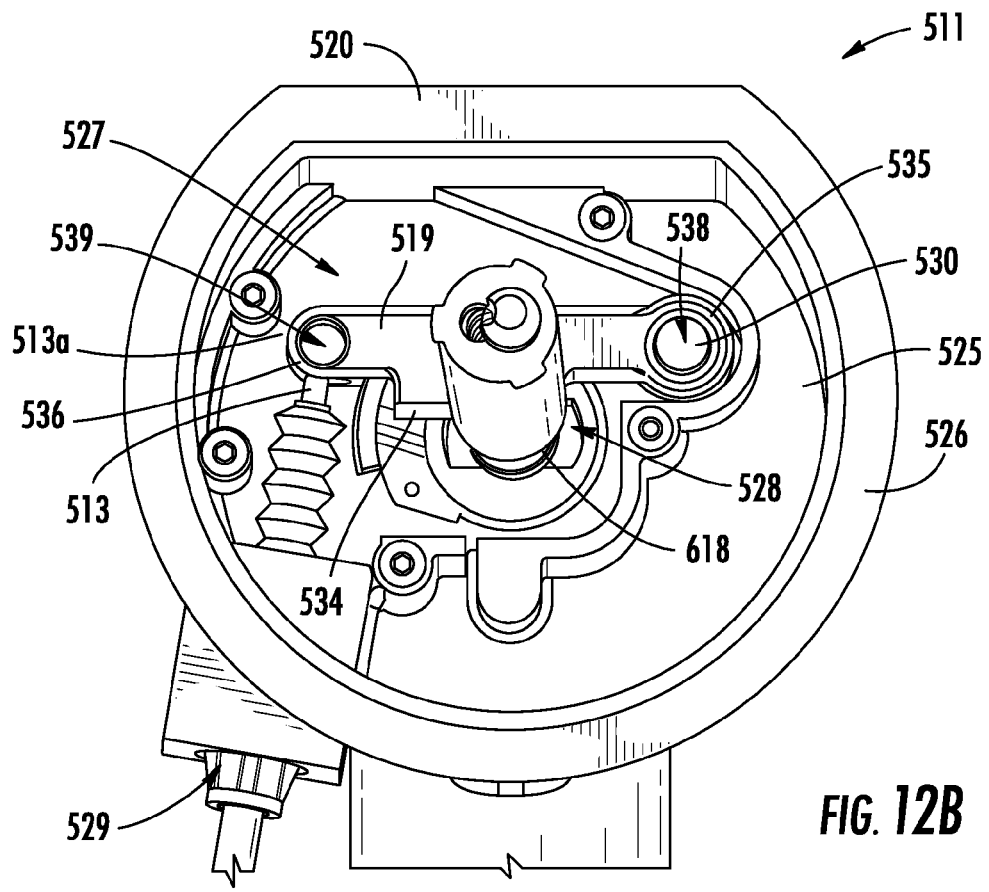
FIG. 12B is a perspective view of the control assembly of FIG. 12, however, with a linear activated driving member engaged to the housing.
Figure 12C:
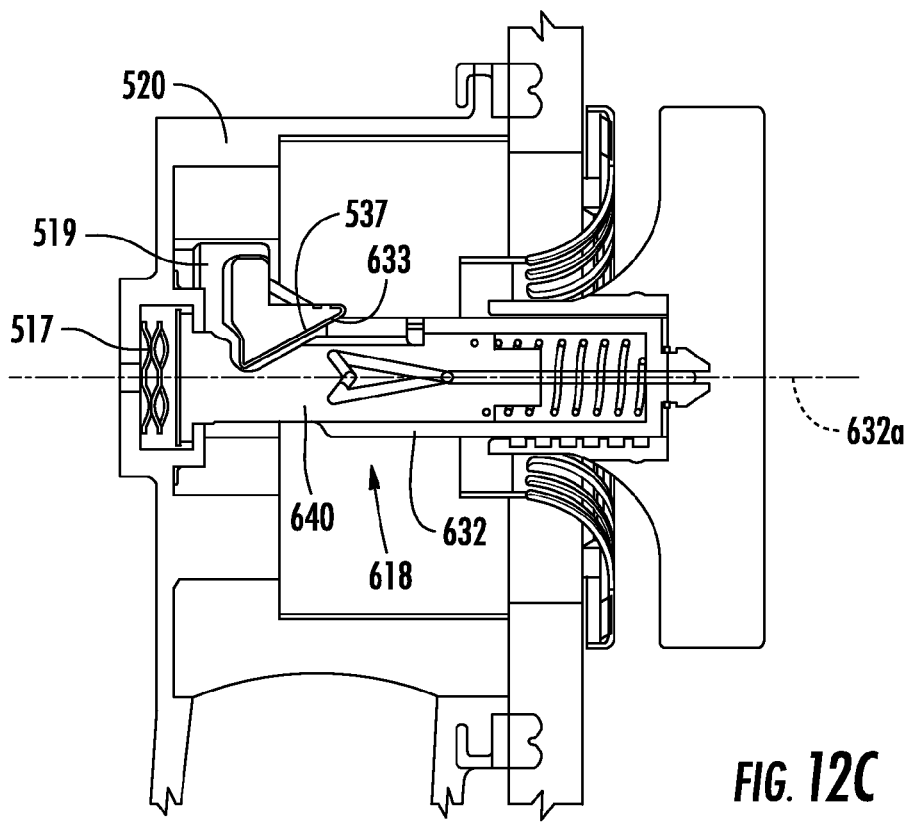
FIG. 12C is a cross-section al view of the control assembly of FIG. 12B.

As shown in FIGS. 12A and 12C, the control assembly 511 may also include a biasing member 517. The biasing member 517 is configured to impart a biasing force into, for example, the driving member 518, such as to bias the driving member 518 to aid in retaining the driving member 518 into engagement with the housing 520. For example, the driving member 518 may have a key-way feature that passes into an opening of the housing, whereupon rotation of the driving member 518 the keyway feature of the driving member 518 is out-of-phase with the opening of the housing 520, such that a portion of the key-way is blocked by a portion of the housing to prohibit removal of the driving member 518 from the housing 520 (without further rotation). The biasing member 517 may impart a force into the driving member 518 to retain it into position to thereby maintain engagement of the driving member 518 to the housing 520.

Figure 13:
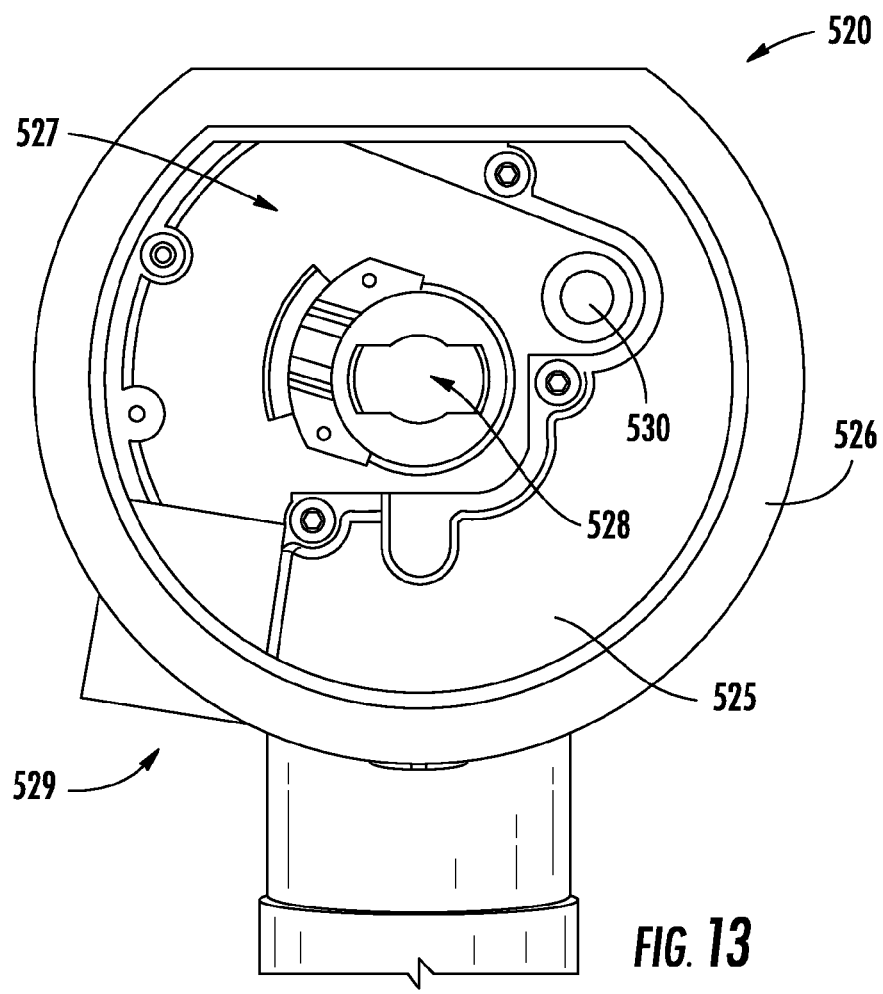
FIG. 13 is a perspective view of the housing of the control assembly of FIG. 12.

As shown in FIG. 13, the housing 520 may include a base 525 and a wall 526 (e.g., a peripheral wall) that extends from the base 525. The base 525 may define a first cavity 527, in which the driven member 519 pivots therein, and a second cavity 528, in which the driving member 518 rotates therein. The base 525 may also include an opening 529 (see FIG. 12) for the cable 513 to pass therethrough, such as to engage the driven member 519. The first cavity 527 may include a post 530 to pivotally support the driven member 519. For example, the post 530 may be round in shape to engage a mating round hole in the driven member 519 to allow the driven member 519 to pivot about the round post 530.

As shown in FIGS. 12A and 15A, the rotary activated driving member 518 includes an elongated body 532 and a contact surface 533, where the body 532 defines a longitudinal axis 532a. The driving member 518 also includes an end 540 that is configured to be received by the second cavity 528 of the housing 520, such that the driving member 518 may slide axially along the longitudinal axis 532a relative to the housing 520 to selectively engage (e.g., connect) the driving member 518 to the housing 520. The driving member 518 is also configured to rotate about the longitudinal axis 532a relative to the housing, such as to move the cable 513 through the driven member 519. The contact surface 533 may contact the driven member 519, and may be configured having an oblique angle relative to the longitudinal axis 532a. The contact surface 533 may also be configured to extend along an arm 534 extending from the end 540. As shown in FIGS. 15A and 15B, the driving member 518 may also include a feature for coupling a handle 544 thereto. For example, the body 532 may include an aperture 541 in the end opposite the end that engages the housing 520, wherein the aperture 541 may receive a fastener for coupling the handle to the driving member. As another example, the body 532 may include grooves or threads that receive corresponding grooves or threads in the handle, or may another connection, such as discussed herein.

Figure 15D:
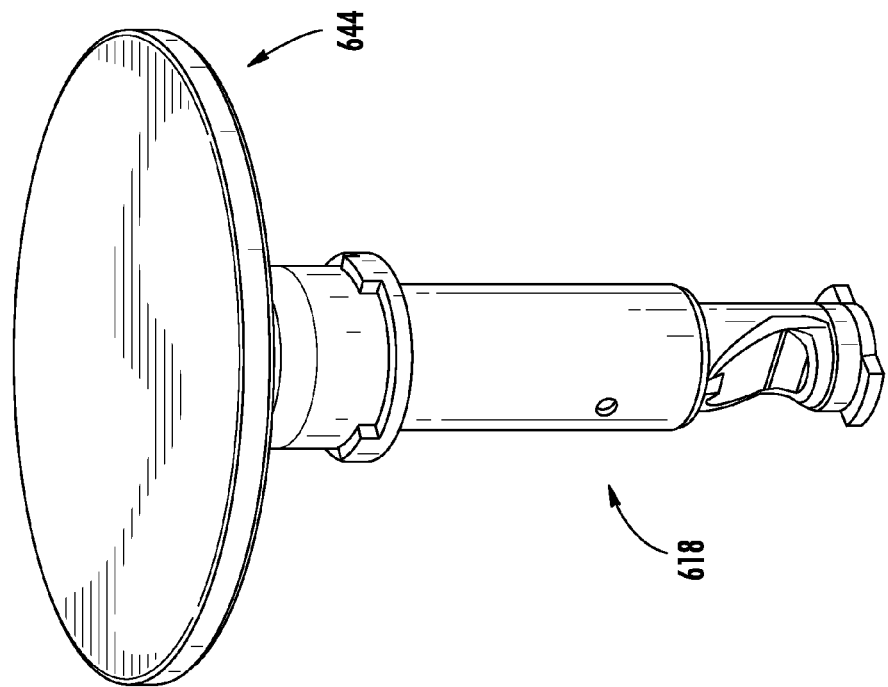
FIG. 15D is a perspective view of the driving member of FIG. 15C with a handle coupled thereto.
Figure 15C:
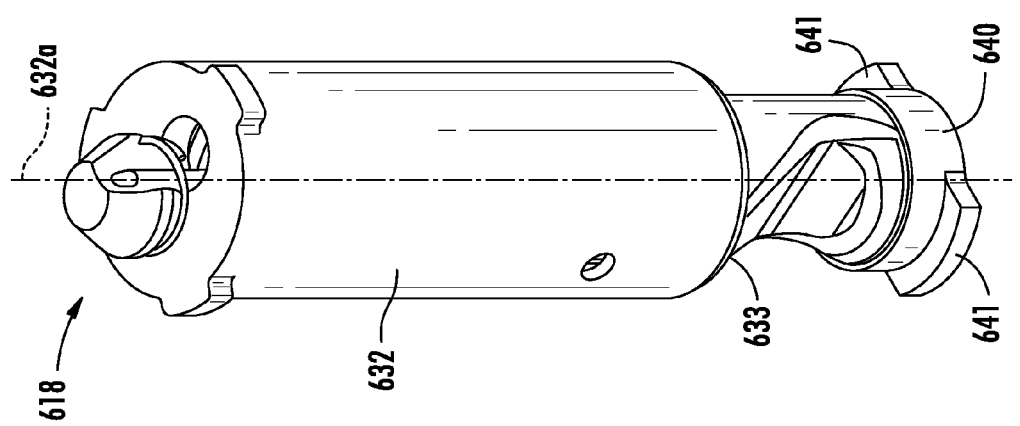
FIG. 15C is a perspective view of a linear activated driving member for use in a control assembly, such as the control assembly of FIG. 12B.

As shown in FIGS. 12C and 15C, the linear activated driving member 618 includes an elongated body 632 and a contact surface 633, where the body 632 defines a longitudinal axis 632a. The driving member 618 also includes an end 640 that is configured to be received by the second cavity 528 of the housing 520. For example, the end 640 may be circular in shape, and may include members 641 (e.g., semi-circular members) extending therefrom to form a key-way feature for selectively engaging the driving member 618 to the housing 520. The driving member 618 is configured to slide axially along the longitudinal axis 632a relative to the housing 520 to selectively engage (e.g., connect) the driving member 618 to the housing 520. The body 632 of the driving member 618 is also configured to move (e.g., slide) along the longitudinal axis 632a relative to the end 640, such as to move the driven member 519 to thereby move the cable 513. The contact surface 633 is configured to contact the driven member 519, and may be configured having an oblique angle relative to the longitudinal axis 632a. When the body 632 is moved relative to the end 640, the contact surface 633 moves along the oblique surface (e.g., the ramp) of the contact surface 537 of the driven member 519, causing the driven member 519 to rotate. As shown in FIG. 15D, the driving member 618 may also include a feature for coupling a handle 644 thereto.

Figure 14:
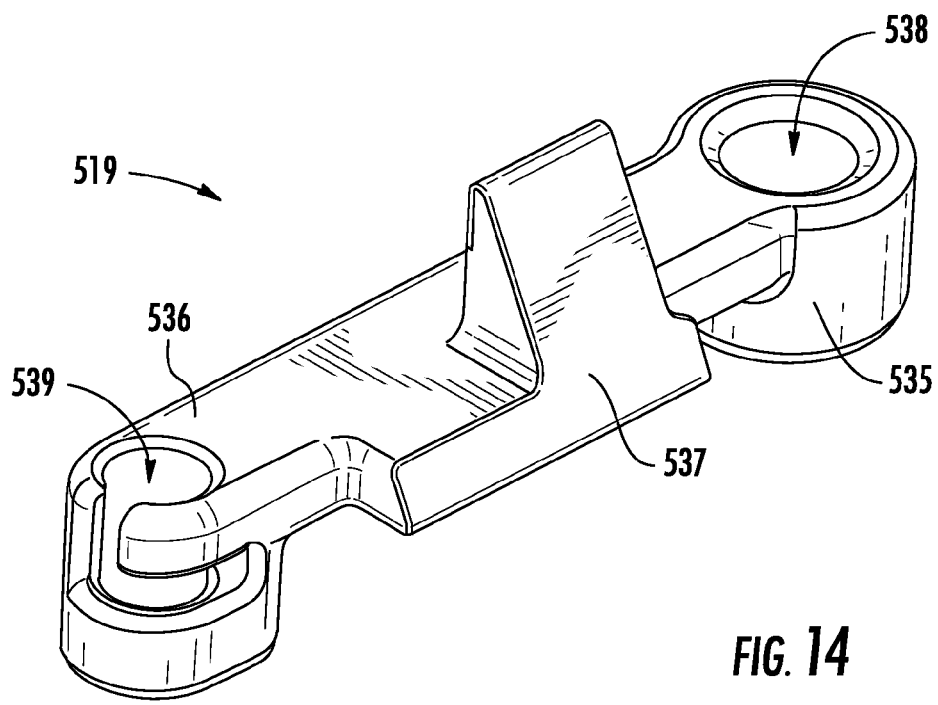
FIG. 14 is a perspective view of a driven member for use in a control assembly, such as the control assembly of FIG. 12.

As shown in FIG. 14, the driven member 519 may be an elongated member having a first end 535, a second end 536, and a contact surface 537. The first end 535 may include a round opening 538 that defines a pivot axis, in which the driven member 519 pivots thereabout. The size (e.g., diameter) of the opening 538 in the first end 535 may be tailored to size the post 530 in the first cavity 527, such that the driven member 519 pivots in an efficient manner about the post 530 of the housing 520. The second end 536 may retain an end 513a of the cable 513, such that when the driven member 519 pivots about the post 530, the second end 536 rotates relative to the first end 535 to thereby move the end 513a of the cable 513 a predetermined length. The second end 536 may include a retaining feature 539 to retain the end 513a of the cable 513.

As shown in FIG. 12, the end 513a of the cable 513 may include a ball-type fitting. Accordingly, the retaining feature 539 may be a spherical shaped void that receives the ball-fitting of the end 513a of the cable 513. This configuration allows the ball-fitting to pivot relative to the second end 536 of the driven member 519, as the end 513a is moved by the pivoting driven member 519. As another example, the retaining feature 539 may be generally cylindrical in shape having an L-shaped opening in the second end 536 to allow the ball-type fitting to be inserted into the retaining feature 539 wherein the L-shaped opening retains the cable. As shown in FIG. 12A, the contact surface 537 of the driven member 519 is configured to contact the contact surface 533 of the driving member 518, such that rotation of the driving member 518 causes the driven member 519 to pivot about the pivot axis of the first end 535. The contact surface 537 of the driven member 519 may be configured at an oblique angle that is similar to the contact surface 533 of the driving member 518, or may have any suitable configuration that allows for the movement of the driven member 519.

The driving member 618 is configured to be moved (e.g., slide) between first and second positions, such as by a linear input manipulation by a user into the driving member 618 or a handle 644 coupled thereto. Movement of the driving member 618 between the first and second positions moves the driven member 519 and cable 513 coupled thereto between the first and second positions of the cable 513. When the driving member 618 is moved linearly along the longitudinal axis 632a, such as between the first and second positions, the contact surface 633 moves a corresponding amount, where the contact surface 633 of the driving member 618 being in contact with the contact surface 537 of the driven member 519 acts like a ramp to drive the rotation of the driven member 519 about the first end 535.

Alternatively, the driving member 518 is configured to be moved (e.g., rotated) between third and fourth positions, such as by rotary input manipulation by a user. The driving member 518 is configured to rotate about the longitudinal axis 532a, such as relative to the second cavity 528 of the housing 520, between the third and fourth positions to move the driven member 519 and cable 513 coupled thereto between the first and second positions of the cable 513. When the driving member 518 is moved rotationally between the third and fourth positions, the arm 534 rotates a corresponding amount, where the arm 534 acts like a lever to induce movement (e.g., rotation) of the driven member 519 about the post 530 of the housing 520. The contact surface 533 may extend along a surface of the arm 534, or alternatively the arm 534 may have a second contact surface that extends along a face of the arm 534 in a radial direction from the body 532, where the second contact surface may contact the driven member 519 to drive rotation of the driven member 519 upon rotation of the driving member 518.

As the driven member 519 pivots about the post 530, the second end 536 moves the retained end 513a of the cable assembly 15. The second end 536 of the driven member 519 is configured to pivot about an arc that corresponds to a change in length of the cable that moves the cable between first and second positions, which in turn switches the drain valve assembly between the open and closed positions. Accordingly, it should be noted that the arc length that the driven member pivots can be varied to vary the change in length of the cable to accommodate different cable stroke lengths, such as for different configurations of drain valve assemblies.

FIGS. 16-18B illustrate an exemplary embodiment of the drain valve assembly 13. The drain valve assembly may include an overload device (or assembly) that is configured to limit the load (e.g., the force) transferred through the cable to the coupled components of the control assembly and/or the drain valve assembly. In effect, the overload device provides a designed safety margin to the components of the drain valve assembly. For example, if a person steps on the drain stopper, only a portion of the weight of the person may be transferred through the drain valve assembly because a portion of the weight is managed through the overload device.

The drain valve assembly 13 may include a housing 64, a drain stopper 65, and a rotatable lever 66. The housing 64 may be coupled to a bathroom device or fixture, such as to a bathing tub, and may support the drain stopper 65 and the rotatable lever 66. The drain stopper 65 may be configured to move between a first open position and a second closed position. In the open position, the drain stopper 65 allows water to drain through the drain valve assembly 13 from the bathing tub, such as through a drain hole or opening. In the closed position, the drain stopper 65 prohibits water from draining through the drain valve assembly 13 to allow water to accumulate, such as in the basin of the bathing tub. The rotatable lever 66 is configured to be rotated, such as by movement of the cable assembly 15, to in turn move the drain stopper 65 between the open and closed positions.

The housing 64 may include a base 68 for fixing the housing 64 in place, such as to a wall 7 or an opening in the wall of the bathing tub or to any suitable bathroom fixture. The base 68 may be annular in shape having an opening, such as the central opening 68a, to allow the drain stopper 65 to pass therethrough, as well to allow the water from the tub to enter the housing 64, such as when the drain stopper 65 is the open position. The housing 64 may also include an outer wall 69 that extends from the base 68 to form or define a cavity 70 therein. The wall 69 may have an annular or tubular cross-section (e.g., circular) that extends having any suitable shape (e.g., linear, elbow, curved). The cavity 70 is in fluid communication with the opening 68a in the base 68, such that water entering the housing 64 through the opening 68a passes into cavity 70. The end of the wall 69 (e.g., the end that is opposite to the end that abuts the base) may be coupled to a drainpipe, such as the drainpipe 17b (as shown in FIG. 1), whereby the cavity 70 may be in fluid communication with a cavity that is defined by a drainpipe, such as drainpipe 17b. The wall 69 may include a support 69a that may be configured to support and/or guide the drain stopper 65. The wall 69 may also include an opening 69b that may be configured to receive a portion of the rotatable lever 66.

The drain stopper 65 may include a cap 65a and a post 65b that extends from the bottom surface of the cap 65a. The cap 65a may be configured to cover the drain hole in the tub wall 7 (e.g., the floor, the bottom), the opening 68a in the housing 64, or both when the drain stopper 65 is in the closed position. The drain stopper 65 may also include a sealing member or portion 71 that may be provided below the cap 65a to prohibit the escape of water through the drain valve assembly 13 when the drain stopper 65 is in the closed position. The sealing member 71 may be integrally formed with the drain stopper 65 or may be formed separately and coupled thereto, and may be made from any suitable material, such as from a resilient material. The post 65b of the drain stopper 65 may be configured as a circular shape or any suitable shape. The support 69a of the wall 69 of the housing 64 may include a bore to guide the post 65b, as the drain stopper 65 moves between the open and closed positions.

Figure 16:
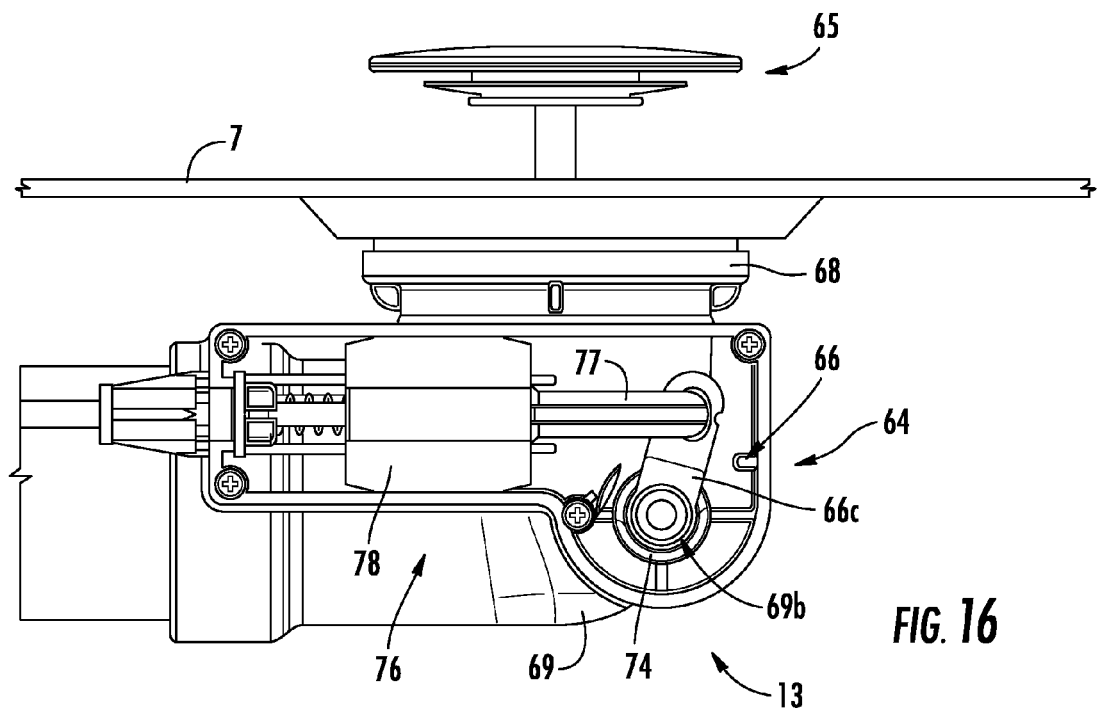
FIG. 16 is a side view of an exemplary embodiment of a drain valve assembly having a cable overload device, where the drain valve is shown in the open valve position.
Figure 16A:
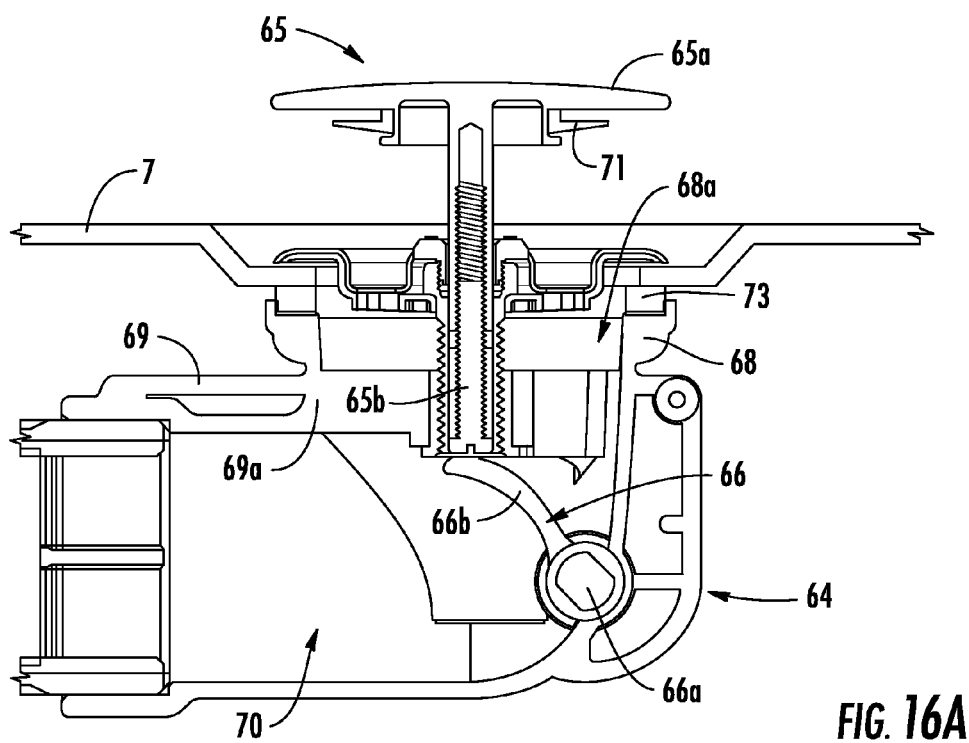
FIG. 16A is a cross-sectional view of the drain valve assembly of FIG. 16.
Figure 17:
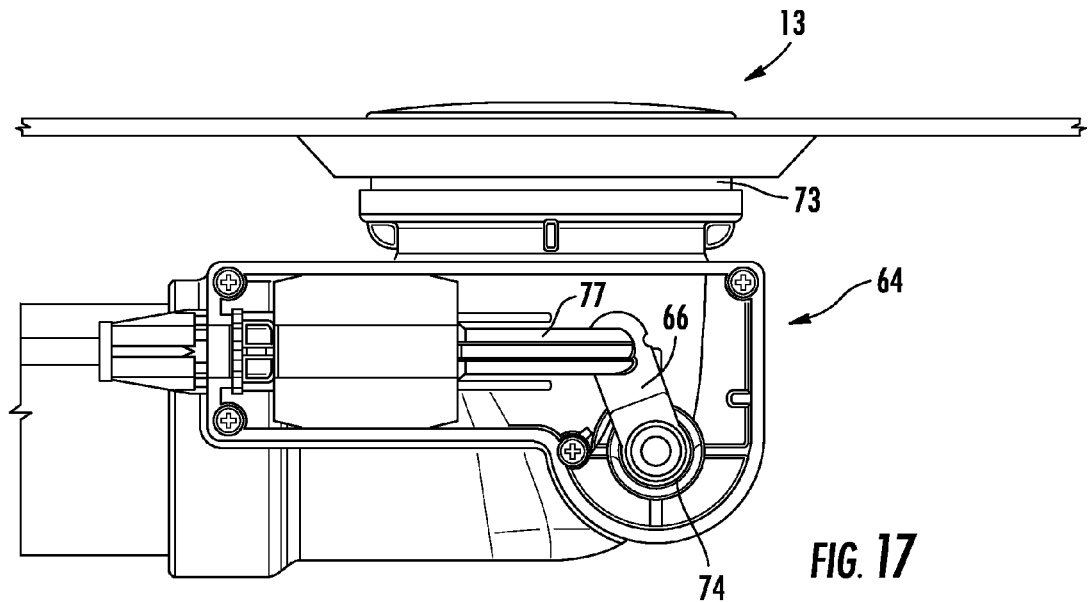
FIG. 17 is a side view of drain valve assembly of FIG. 16, shown in the closed valve position.
Figure 17A:
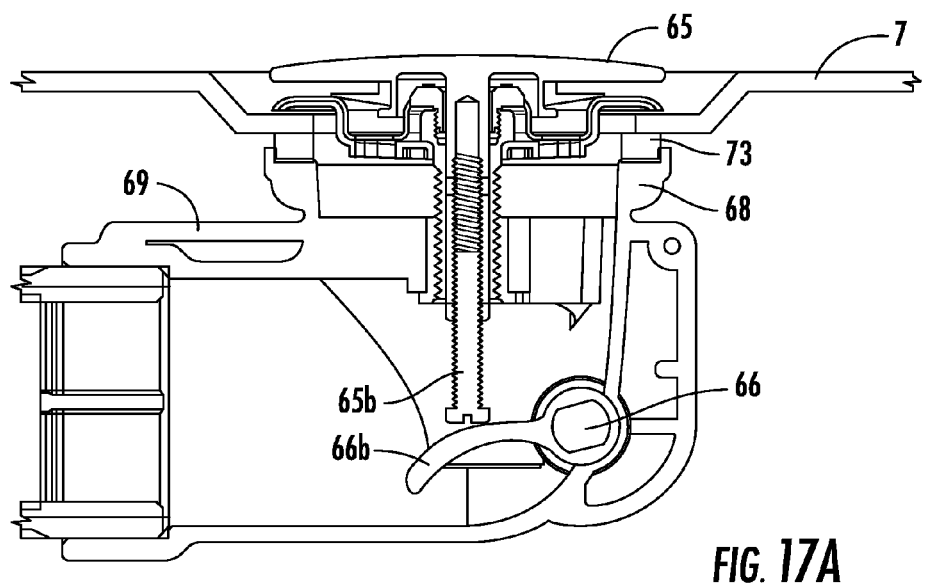
FIG. 17A is a cross-sectional view of the drain valve of FIG. 17.

The rotatable lever 66 is configured to move the drain stopper 65 between the open and closed positions, when driven to movement, such as by the cable assembly 15. The rotatable lever 66 may include a shaft 66a (e.g., body) having a first (e.g., inner) arm 66b and a second (e.g., outer) arm 66c that extend from the shaft 66a. The shaft 66a may pass through the opening 69b of the wall 69 of the housing 64, wherein the wall 69 may act as a bearing or guide for efficient rotation of the rotatable lever 66 relative to the housing 64. The first arm 66b may be configured to reside in the cavity 70 of the housing 64 and have a distal end that is configured to contact the drain stopper 65 to move the drain stopper 65 between open and closed positions that correspond to movement of the rotatable lever 66. The second arm 66c may be configured to reside outside of the wall 69 of the housing 64 (e.g., outside the cavity 70), in order to be coupled to another device that is configured to move the second arm 66c to thereby rotate the rotatable lever 66 to move the drain stopper 65 between the open and closed positions. The second arm 66c may include a distal end having an opening that receives a lever, wherein the lever may move the second arm 66c between an open position, as shown in FIGS. 16 and 16A, and a closed position, as shown in FIGS. 17 and 17A. For example, the second arm 66c may be coupled to an overload device, such as discussed herein.

The drain valve assembly 13 may further include a seal or gasket 73 to prohibit the leaking of water. As shown, the gasket 73 may be provided between the base 68 of the housing 64 and the wall 7 of the bathing tub to prohibit the leaking of water therebetween. However, the gasket may be provided at any suitable location. Additionally, the drain valve assembly 13 may include a plurality of gaskets.

The drain valve assembly 13 may also include a biasing member 74 to provide a force to bias the rotatable lever 66. The biasing member 74 may bias the rotatable lever 66 in the direction of closing or in the direction of opening. The biasing member 74 may be configured as a spring (e.g., coil spring, clock spring, extension spring, helical spring, etc.) or may have any suitable configuration that imparts a biasing force into the rotatable lever 66.

An escutcheon (e.g., faceplate) may be coupled to the drain valve assembly 13 to provide improved aesthetics to the drain system 10, whereby the aesthetics may be tailored to accommodate customer preference by switching out escutcheons. The escutcheon is discussed in greater detail below.

Figure 18A:
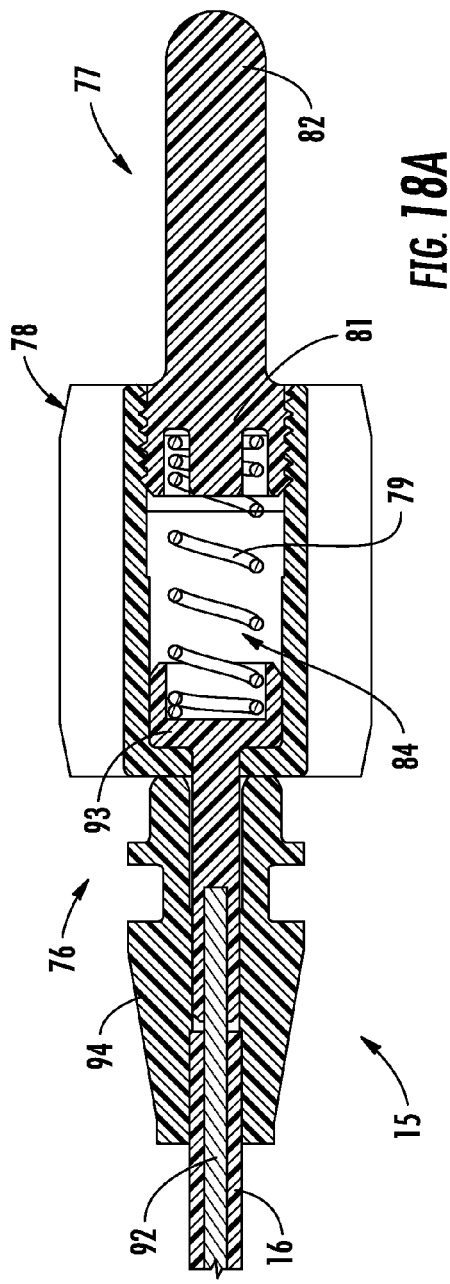
FIG. 18A is a cross-sectional view of an overload device for a drain valve assembly, shown in the normal use position.
Figure 18B:
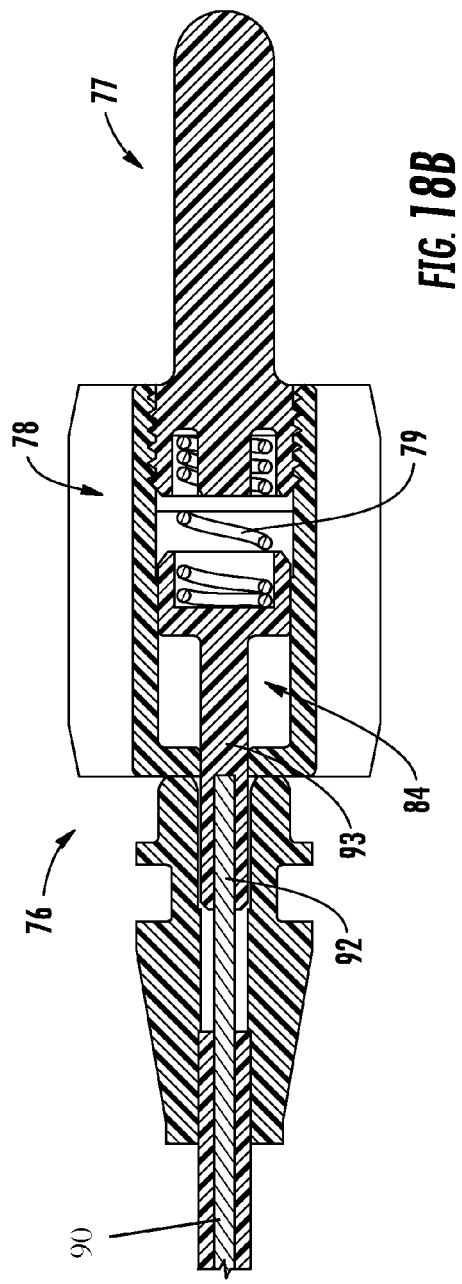
FIG. 18B is a cross-sectional view of an overload device for a drain valve assembly, shown in the loaded use position.

FIGS. 18A and 18B illustrate an exemplary embodiment of an overload device 76 (e.g., overload assembly). As shown, the overload device 76 may be provided between the cable assembly 15 and the drain valve assembly 13 to manage overloading in the cable, such as when a person steps on the drain stopper 65 when the drain stopper 65 is configured in the open position. The overload device 76 may include a linking member 77, a sleeve 78, and an energy absorber 79. The linking member 77 may be coupled to the rotatable lever 66, whereby movement of the linking member 77 may drive movement (e.g., rotation) of the rotatable lever 66. The sleeve 78 may be configured to house the energy absorber 79, a portion of the linking member 77, and a portion of the cable assembly 15 to act as a guide to maintain alignment of the portion of the cable assembly 15 and the linking member 77, as well as the energy absorber 79.

The linking member 77 may include a first end 81 and a second end 82. The second end 82 may be coupled to the rotatable lever 66, whereby movement of the linking member 77 drives movement of the lever 66. For example, the second end 82 of the linking member 77 may be pivotally coupled to the second arm 66c of the rotatable lever 66, whereby substantially linear movement of the linking member 77 drives rotation of the lever 66 about the shaft 66a. As shown in FIG. 18A, the first end 81 may be coupled to the sleeve 78, such as through a threaded engagement, whereby the linking member 77 and the sleeve 78 may operate (e.g., move) together. For example, the outer surface of the first end 81 may include external threads that engage internal threads on the inner surface of the sleeve 78.

The sleeve 78 may be configured as a hollow cylindrical member having a bore 84. The bore 84 may pass through the entire length of the sleeve 78 and may be configured to receive the energy absorber 79, a portion of the linking member 77, and/or a portion of the cable assembly 15. For example, the bore 84 may have internal threads that are engaged by external threads on the first end 81 of the linking member 77. As shown in FIG. 18A, the cable assembly 15 may include a plunger 93 that is coupled to the driven end 92 of the cable 90, such that movement of the cable 90 moves the plunger 93 in the corresponding direction a corresponding length. The bore 84 (e.g., the end of the bore 84 that is opposite the end coupled to the linking member 77) may receive the plunger 93, wherein the plunger 93 may move within the bore 84 relative to the sleeve 78.

The energy absorber 79 may be provided in the bore 84 between the plunger 93 and the first end 81 of the linking member 77, wherein the energy absorber 79 is configured to manage (e.g., absorb) a load or force transferred through the overload device 76. As shown in FIG. 18A, the energy absorber 79 may be a spring, such as an extension spring or coil spring, that absorbs force by compressing and storing energy therein. As shown in FIG. 18B, the outer end of the plunger 93 may be configured with a bore to receive one end of the energy absorber 79, while the first end 81 of the linking member 77 may include an opposing bore to receive the other end of the energy absorber 79. This configuration helps maintain the alignment between the plunger 93, the energy absorber 79, and the linking member 77, while efficiently transferring loads to the energy absorber 79. Thus, motion can be efficiently transferred through the energy absorber 79 and the overload device 76, such as to drive the opening or closing of the drain valve assembly 13, while absorbing loads in an overload condition.

During an overload condition, the energy absorber 79 may be configured to absorb any load or force greater than a threshold load (e.g., 30 lbs) that is imparted onto the drain stopper 65 and transfer only the threshold load (e.g., 30 lbs) to the cable assembly. The drain valve assembly 13 may be configured such that any additional load imparted into the drain stopper 65 beyond the threshold load causes the drain stopper 65 to contact the wall 7 of the bathroom fixture (or any suitable structural member) to thereby transfer the additional loads directly into the fixture. For example, if 300 lbs are imparted onto the drain stopper 65 when in the open position, the energy absorber only transfers the threshold load (e.g., 30 lbs of the 300 lbs), while the remaining load (e.g., 270 lbs) are transferred directly into the bathtub from the drain stopper 65. It should be noted that the threshold load (e.g., the force) that is managed through the overload device 76 may be varied, as well as any maximum load that the drain system may be configured to withstand, and that the weights and loads disclosed herein are examples and are not limiting. Additionally, the overload device 76 may be configured to include devices other than (or in addition to) springs, such as dampers or dashpots, which may help absorb or dissipate energy.

The drain system (e.g., the cable assemblies) may include an overload device 76 to prevent damage to the drain system (e.g., the cable assembly), such as in the event a person steps on a drain stopper in the open position. For example, if a person steps on the drain stopper 65 when configured in the open position, such as shown in FIG. 16, the weight of the person may move the drain stopper 65 toward the closed position, as shown in FIG. 17. The force imparted from the mass of the person to the drain stopper 65 is transferred from the drain stopper 65 to the rotatable lever 66 of the drain valve assembly 13, which in turn transfers the force to the linking member 77 of the overload device 76, causing the linking member 77 to move with the lever 66 relative to the plunger 93 of the cable assembly 15. The overload device 76 (e.g., the energy absorber 79) is configured to absorb a predetermined amount of force or load (e.g., a threshold force) to prohibit the full force of the weight of the person from being transferred directly to the cable assembly 15 and the control assembly 11, because the cable assembly 15 and the control assembly 11 are still configured in the open position. By reducing the overload forces that are transferred to the control assembly 11 through the cable assembly 15 from the drain valve assembly 13, the overload device 76 reduces the chance of damage to the drain system 10 (e.g., the control assembly 11, the drain valve assembly 13, the cable assembly 15).

The overload device 76 also allows for the use of lower strength and lower mass materials, such as polymers and plastics, for components of the drain system that have traditionally been made from stronger and higher mass materials. The overload device 76 absorbs energy to reduce the force that is transferred or communicated through the cable. By transferring less force through the system, the components that are in the load path, such as the sliding member 40 and actuator 22 of the control assembly 11 as well as the drain stopper 65 and rotatable lever 66 of the drain valve assembly 13, see less force and, therefore, may be configured to manage the reduced load by having a reduction in mass.

For example, without the overload device 76 and the energy absorber 79 therein, the force transferred to the linking member may be directly transferred to the end of the cable without any reduction in energy. This may result in damage to the control assembly (e.g., the actuator), the cable assembly, and/or to the drain valve assembly (e.g., the drain stopper).

According to another embodiment, the plunger that is coupled to the cable may also be coupled to the sleeve, such that the sleeve and plunger move together as one, while the linking member may move relative to the sleeve. For example, the plunger may include external threads to engage internal threads in the sleeve, while the linking member may have a smooth outer surface that slides along the inner surface of the bore of the sleeve.

The cable assembly 15 may include a cable 90 that may be provided within a conduit 16 (e.g., sheath, casing, etc.) to reduce the friction to improve efficiency of the cable 90. The cable assembly 15 may be routed outside of the drainpipes (e.g., drainpipe 17b) of the drain system 10, such as shown in FIG. 1, where the cable assembly 15 may communicate (e.g., motion) from the control assembly 11 to the drain valve assembly 13. Alternatively, the cable assembly may be configured to be routed inside one or more of the drainpipes of the drain system to communicate motion.

The cable 90 may include a wire that may be wound like a spring to have a spring like function, or may be configured using any suitable manner to communicate motion. The cable 90 having a wound wire configuration allows for the cable to turn at sharp or abrupt angles (e.g., 90 degrees) over relative short distances (e.g., small radii), while retaining a relative high efficiency. Accordingly, the cable may be routed out the back of the rear portion 27 of the housing 20 in a generally straight direction, as shown in FIG. 5A, or may be routed out the back of the rear portion 27 and turn at any angle, such as turn at ninety degrees to route in a downwardly direction adjacent to the drainpipe 17a.

The cable 90 may include a driving end 91 and a driven end 92, whereby the cable 90 is configured to transfer motion from the driving end 91 to the driven end 92 to communicate the input manipulation by a person (e.g., user) from the control assembly 11 to the drain valve assembly 13. As shown in FIG. 5A, the driving end 91 may be coupled to the control assembly 11, such as to the sliding member 40 of the control assembly 11. Accordingly, manipulation of the actuator 22 between the open and closed positions, may move the sliding member 40 thereby moving the driving end 91 of the cable 90 between corresponding open and closed positions. As shown in FIG. 18A, the driven end 92 of the cable 90 may be coupled to the plunger 93, whereby movement of the driven end 92 results in a corresponding movement of the plunger 93.

The cable assembly 15 may further include one or more fittings 94. The fittings 94 may be configured to retain the cable assembly 15 by fixing a portion thereof to another component. For example, the fittings 94 may be coupled to the conduit 16 of the cable assembly 15, such that the ends 91, 92 may move relative to the fittings 94 and/or the conduit. Each fitting 94 may also be configured to attach (e.g., couple) to a fixed member, such as the housing of the drain valve assembly.

The cable assemblies disclosed herein, such as cable assembly 15, may be used in conjunction with either actuator 22 of the control assembly 11 to control the opening and the closing of the drain valve assembly 13. For example, the cable assembly 15 that is configured to be routed out the back of the rear portion 27 of the housing 20 of the control assembly 11 may be moved by a rotary actuator, such as actuator 222. Accordingly, the user may input a rotational manipulation to thereby rotate the actuator 222 to move (e.g., pull, push) the cable to open and close the drain stopper 65 of the drain valve assembly 13. Alternatively, the user may install the linear actuator 122, whereby the user may input a linear manipulation to thereby move the cable to open and close the drain stopper 65 of the drain valve assembly 13.

Figure 20:
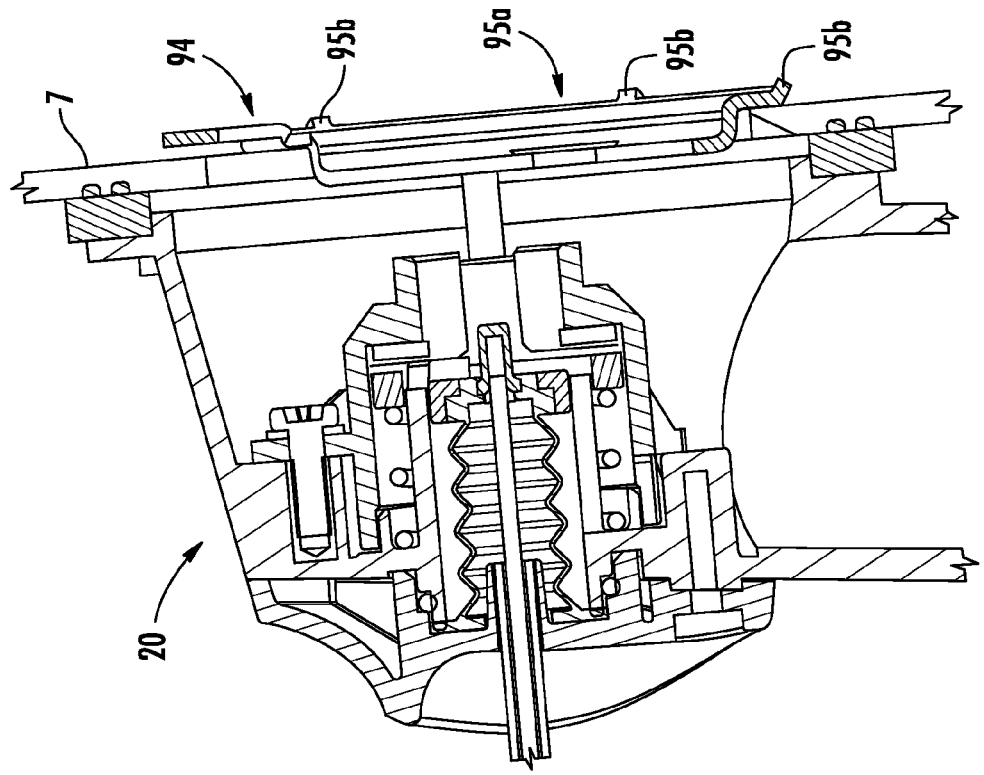
FIG. 20 is a front view of the mounting plate of FIG. 19.
Figure 19:
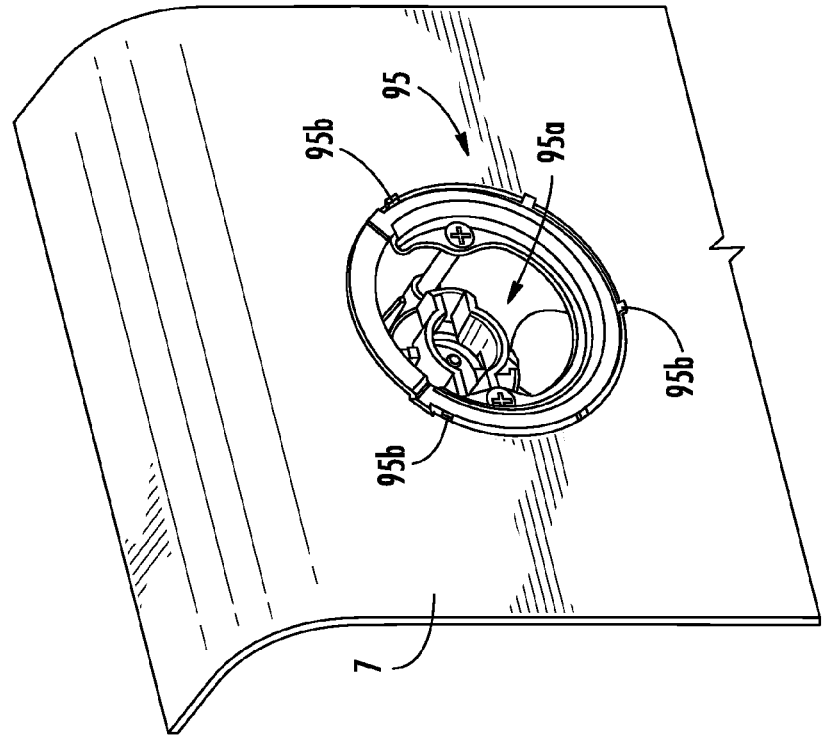
FIG. 19 is a perspective view of a mounting plate coupled to the housing of the control assembly with a portion of the bathing tub provided between the mounting plate and housing.
Figure 21A:
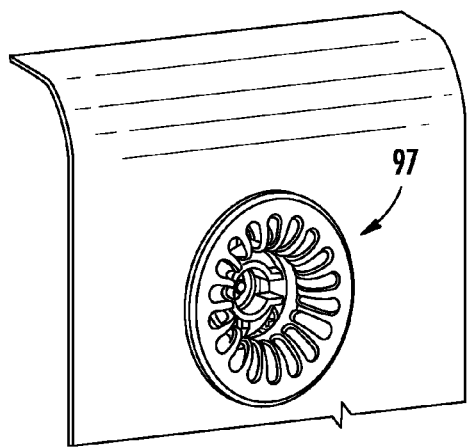
FIGS. 21A-21D are perspective views of various exemplary embodiments of escutcheons that may be interchangeably used to tailor the aesthetics of the drain system.
Figure 21B:
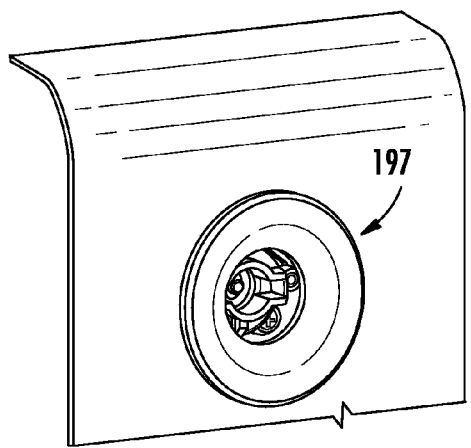
Figure 21C:
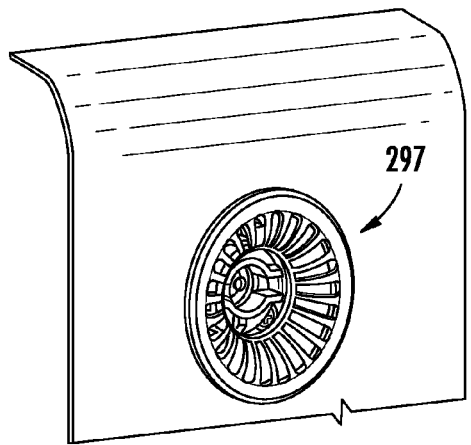
Figure 21D:
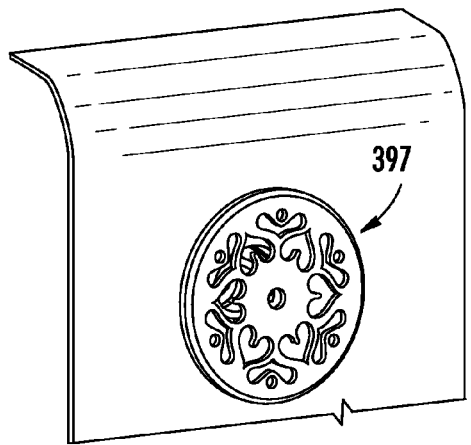

FIGS. 19-20 illustrate an exemplary embodiment of a mounting plate 95 that is configured to be coupled to the control assembly 11 (e.g., the mounting base 25 of the housing 20) to provide for mounting of an escutcheon 97 thereto. The mounting plate 95 may mount to the external surface of the wall 7 of the bathroom device or fixture, and may be coupled to the control assembly 11 through any suitable method, such as conventional fasteners (e.g., screw, bolt). The mounting plate 95 may be annular shaped to engage an annular hole in the wall 7 of the fixture, wherein the annular shaped mounting plate 95 may include an opening 95a to allow the actuator 22 to pass therethrough, such as to permit the actuator 22 to engage the housing 20 and/or the switching mechanism 21. The mounting plate 95 may further include one or more than one tab 95b, which may provide for selective coupling of the escutcheon 97. For example, the mounting plate 95 may include a plurality of tabs 95b that are circumferentially configured around the mounting plate 95 at various angular travels or distances.

A mounting plate 195 may be configured to be coupled to the drain valve assembly 13 to provide for mounting of an escutcheon thereto. The mounting plate 195 may mount to the external surface of a wall (e.g., lower wall) of the bathroom device using any suitable method, and the mounting plate 195 may include one or more tabs to allow for coupling of an escutcheon thereto. The mounting plate 95 for the control assembly 11 and the mounting plate 195 for the drain valve assembly 13 may be similarly configured or may be configured differently. For example, the mounting plates 95, 195 may include a similar number of tabs that are located at common locations (e.g., diameter, angular distance, radial distance), whereby a common escutcheon (e.g., the escutcheon 97) may be coupled to one or both of the mounting plate 95, 195. However, the mounting plates 95, 195 may be configured to be dissimilar, such as by having different diameters or differently configured tabs (e.g., number, location).

Additionally, the drain valve systems and the control assemblies, as disclosed herein, may include aesthetic escutcheons that may be easily replaced by the customer without having to replace any of the hardware, such as the housings of the control assemblies and/or the drain valve assemblies or portions thereof below the wall of the bathroom fixture, to allow the user to tailor the aesthetics of the drain valve systems, such as to match other fixtures in the bathroom, without the cost and difficulty of replacing the hardware of the systems. In effect, the customer may give the fixture a "face-lift" at minimal expense and labor, simply by replacing the escutcheon.

FIGS. 21A-21D illustrate exemplary embodiments of escutcheons 97, 197, 297, 397. The escutcheons 97, 197, 297, 397 are configured to be able to be selectively coupled to the mounting plates 95, 195, such as, for example, by snapping over the tabs of the mounting plates. The escutcheons 97, 197, 297, 397 may include a feature, such as a pocket or hook on the backside to receive the mounting tab of the mounting plate. The escutcheon and/or the mounting plate may be configured to be flexible in order to allow flexing when the escutcheon is coupled to the mounting plate. Accordingly, the escutcheon may be secured or coupled to the mounting plate using an interference fit, and the escutcheon and mounting plate can accommodate a relative greater variation (e.g., tolerance) of the wall of the bathroom fixture. The escutcheon (e.g., outer surface) may be configured having a decorative design and/or may be made from a material (e.g., brass, stainless steel) to improve the aesthetics of the drain system.

The configuration of the escutcheon and the mounting plate allows for the customer to thereby tailor the aesthetics of the drain system simply by replacing the current escutcheon with another escutcheon having a preferred appearance. For example, the customer may remove the escutcheon 97 and install in its place the escutcheon 197 to thereby tailor the aesthetics of the drain system without replacing any hardware, such as the rough-in assembly or the mounting plate.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the drain systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A cable overload device for a cable-actuated drain system that includes a drain valve assembly and a drain control assembly where the cable includes a driving end connected to the control assembly and a driven end, the overload device comprising:
    a plunger configured to be coupled to the driven end of the cable;
    a linking member configured to move the drain valve assembly between open and closed positions;
    a sleeve having a bore that extends from a first side to a second side of the sleeve, wherein the bore is configured to receive the plunger through the first side and to receive the linking member through the second side; and
    an energy absorber provided in the bore between the plunger and the linking member to absorb a force imposed into the linking member from the drain valve assembly;
    wherein the linking member is coupled to the sleeve to prevent relative motion between the linking member and the sleeve.

2. The overload device of claim 1, wherein the linking member includes a first end that is coupled to the sleeve to prevent relative motion between the linking member and the sleeve.

3. The overload device of claim 2, wherein the linking member further includes a second end that is configured to move the drain valve assembly between open and closed positions.

4. The overload device of claim 3, wherein a rotatable lever is driven to rotate by movement of the linking member, which in turn moves a drain valve assembly between the open and closed positions.

5. The overload device of claim 2, wherein the plunger is free to move in the bore relative to the sleeve when driven by movement of the cable.

6. A cable overload device for a cable-actuated drain system that includes a drain valve assembly and a drain control assembly where the cable includes a driving end connected to the control assembly and a driven end, the overload device comprising:
a plunger configured to be coupled to the driven end of the cable;
a linking member configured to move the drain valve assembly between open and closed positions;
a sleeve having a bore that extends from a first side to a second side of the sleeve, wherein the bore is configured to receive the plunger through the first side and to receive the linking member through the second side; and
an energy absorber provided in the bore between the plunger and the linking member to absorb a force imposed into the linking member from the drain valve assembly;
wherein the plunger is coupled to the sleeve to prevent relative motion between the plunger and the sleeve.

7. The overload device of claim 6, wherein movement of the cable moves the coupled plunger and sleeve.

8. The overload device of claim 6, wherein the linking member is free to move in the bore relative to the sleeve.

9. The overload device of claim 2, wherein an outer surface of the first end of the linking member is coupled through threads to an inner surface of the bore of the sleeve.

10. The overload device of claim 1, wherein the linking member is integrally formed with the sleeve to prevent relative motion between the linking member and the sleeve.

11. A drain valve system for a fixture, comprising:
a housing configured to mount to a wall of the fixture and having an opening;
a drain stopper configured to move within the opening between an open position and a closed position;
a lever pivotally coupled to the housing and including a first arm and a second arm, the first arm being configured to move the drain stopper upon rotation of the lever;
a cable having a driven end and a driving end that is connected to a drain control assembly configured to move the cable; and
a cable overload device comprising:
a plunger coupled to the driven end of the cable;
a linking member having a first end and a second end coupled to the second arm of the lever, such that movement of the linking member rotates the lever;
a sleeve having a first side that receives the driven end and a second side that receives the linking member; and
an energy absorber disposed between the plunger and the linking member to absorb a force imposed into the linking member from the drain stopper;
wherein the sleeve is configured to move with one of the plunger and the linking member relative to the other of the plunger and the linking member.

12. The drain valve system of claim 11, wherein the sleeve includes a bore that extends from the first side to the second side of the sleeve.

13. The drain valve system of claim 12, wherein the energy absorber is provided in the bore of the sleeve.

14. The drain valve system of claim 11, wherein the first end of the linking member is coupled to the sleeve to prevent relative motion between the linking member and the sleeve.

15. The drain valve system of claim 14, wherein the plunger is free to move relative to the sleeve when driven by movement of the cable.

16. The drain valve system of claim 12, wherein the plunger is free to move in the bore relative to the sleeve when driven by movement of the cable.

17. The drain valve system of claim 11, wherein the plunger is coupled to the sleeve to prevent relative motion between the plunger and the sleeve.

18. The drain valve system of claim 17, wherein movement of the cable moves the coupled plunger and sleeve, and wherein the linking member is free to move relative to the sleeve.

19. The drain valve system of claim 14, wherein the first end of the linking member is coupled through threads to the sleeve.

20. A cable overload device for a cable-actuated drain system that includes a drain stopper and a control assembly, the overload device comprising:
a cable having a driven end and a driving end connected to the control assembly;
a linking member configured to move the drain stopper between an open position and a closed position;
a sleeve having a first side that receives the driven end and a second side that receives the linking member; and
an energy absorber provided between the driven end and the linking member to absorb a force imposed into the linking member from the drain stopper;
wherein the linking member is coupled to the sleeve to prevent relative motion between the linking member and the sleeve.

21. The overload device of claim 20, wherein the driven end includes a plunger, and wherein the first side of the sleeve receives the plunger.

22. The overload device of claim 20, wherein the sleeve includes a bore that extends from the first side to the second side, and wherein the bore receives the driven end through the first side and receives the linking member through the second side.

23. The overload device of claim 20, wherein the linking member includes a first end that is coupled to the sleeve to prevent relative motion between the linking member and the sleeve.

24. The overload device of claim 23, wherein the driven end is free to move relative to the sleeve when driven by movement of the cable.

25. A cable overload device for a cable-actuated drain system that includes a drain stopper and a control assembly, the overload device comprising:
a cable having a driven end and a driving end connected to the control assembly;
a linking member configured to move the drain stopper between an open position and a closed position;
a sleeve having a first side that receives the driven end and a second side that receives the linking member; and
an energy absorber provided between the driven end and the linking member to absorb a force imposed into the linking member from the drain stopper;
wherein the driven end is coupled to the sleeve to prevent relative motion between the driven end and the sleeve, and wherein movement of the cable moves the coupled driven end and sleeve.

26. The overload device of claim 25, wherein the linking member is free to move relative to the sleeve.

* * * * *